United States Patent
Liu et al.

(10) Patent No.: US 11,641,653 B2
(45) Date of Patent: May 2, 2023

(54) METHOD OF CONFIGURING CONTROL RESOURCE SET, NETWORK EQUIPMENT AND TERMINAL

(71) Applicant: VIVO MOBILE COMMUNICATION CO., LTD., Chang'an Dongguan (CN)

(72) Inventors: Siqi Liu, Chang'an Dongguan (CN); Yu Ding, Chang'an Dongguan (CN); Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 95 days.

(21) Appl. No.: 16/646,037

(22) PCT Filed: Aug. 14, 2018

(86) PCT No.: PCT/CN2018/100428
§ 371 (c)(1),
(2) Date: Mar. 10, 2020

(87) PCT Pub. No.: WO2019/047680
PCT Pub. Date: Mar. 14, 2019

(65) Prior Publication Data
US 2020/0267697 A1 Aug. 20, 2020

(30) Foreign Application Priority Data

Sep. 11, 2017 (CN) .......................... 201710814531.8
Sep. 12, 2017 (CN) .......................... 201710819467.2

(51) Int. Cl.
*H04W 72/04* (2009.01)
*H04L 5/00* (2006.01)
*H04W 56/00* (2009.01)

(52) U.S. Cl.
CPC ......... *H04W 72/042* (2013.01); *H04L 5/0053* (2013.01); *H04W 56/001* (2013.01)

(58) Field of Classification Search
CPC ............. H04W 72/042; H04W 56/001; H04W 72/0406; H04L 5/0053; H04L 5/0044; H04L 5/0007; H04L 5/0094
See application file for complete search history.

(56) References Cited

U.S. PATENT DOCUMENTS

| | | |
|---|---|---|
| 2011/0317643 A1 | 12/2011 | Gaal et al. |
| 2014/0057640 A1 | 2/2014 | Nagata et al. |

(Continued)

FOREIGN PATENT DOCUMENTS

| | | |
|---|---|---|
| CN | 103125089 A | 5/2013 |
| CN | 104009820 A | 8/2014 |

(Continued)

OTHER PUBLICATIONS

Chinese Office Action Application No. 201710819467.2; reported on Jul. 2, 2020.

(Continued)

*Primary Examiner* — John D Blanton
(74) *Attorney, Agent, or Firm* — von Briesen & Roper, s.c.

(57) ABSTRACT

A method of configuring a control resource set CORESET, a network equipment and a terminal are provided. The method includes: configuring, for a terminal, indication information for indicating time-frequency domain position information of the CORESET of data information; transmitting the indication information to the terminal. The indication information includes: a first indication field for indicating downlink numerology information and a second indication field for indicating a CORESET configuration codebook.

18 Claims, 27 Drawing Sheets

(56) References Cited

U.S. PATENT DOCUMENTS

| | | | |
|---|---|---|---|
| 2017/0166903 A1 | 6/2017 | Zhang et al. | |
| 2018/0070341 A1* | 3/2018 | Islam | H04W 72/044 |
| 2018/0248669 A1 | 8/2018 | Takeda | |
| 2018/0279281 A1 | 9/2018 | Li | |
| 2018/0368116 A1* | 12/2018 | Liao | H04W 76/27 |
| 2020/0154376 A1* | 5/2020 | Ko | H04W 72/005 |
| 2020/0196324 A1* | 6/2020 | Ji | H04W 76/27 |
| 2020/0214014 A1* | 7/2020 | Wang | H04W 74/0833 |

FOREIGN PATENT DOCUMENTS

| | | |
|---|---|---|
| CN | 106612561 A | 5/2017 |
| CN | 106851744 A | 8/2017 |
| WO | WO 2012144645 A1 | 10/2012 |
| WO | WO 2013155417 A2 | 10/2013 |
| WO | WO 2017026402 A1 | 2/2017 |

OTHER PUBLICATIONS

Chinese Search Report Application No. 201710819467,2; reported on Jun. 2, 2020.

LG Electronics Inc., "Consideration on NR-PBCH contents and payload size", 3GPP TSG-RAN WG1 NR Ad-Hoc #2, R2-1710262.

Extended European Search Report for related Application No. 18853038.0; reported on Feb. 15, 2021.

Mediatek Inc., "Discussions on CORESET configurations", Jun. 27-30, 2017, 3GPP TSG RAN WG1 Meeting NR AH#2, Qingdao, China.

Hisilicon Huawei, "NR RMSI delivery", Aug. 21-25, 2017, 3GPP TSG RAN WG1 Meeting #90, Prague, Czech Republic.

Hisilicon Huawei, "On numerology determination during Initial access", Aug. 21-25, 2017, 3GPP TSG RAN WG1 Meeting #90, Prague, Czech Republic.

Motorola Mobility Lenovo, "Discussion on RMSI delivery,", Aug. 21-25, 2017, 3GPP TSG RAN WG1 Meeting #90, Prague, P. R. Czechia.

Vivo, "Views on NR-PBCH contents and payload size", Aug. 21-25, 2017, 3GPP TSG-RAN WG1 NR Meeting #90, Prague, Czech Republic.

Hisilicon Huawei, "RMSI delivery", Sep. 18-21, 2017, 3GPP TSG RAN WG1 Meeting NR#3, Nagoya, Japan.

* cited by examiner

SSB: 30kHz (pattern1) CORESET: 15kHz

SSB: 120kHz CORESET: 60kHz

SSB: 240kHz CORESET: 120kHz

SSB&CORESET: 15 kHz/30 (pattern SSB: 30kHz
/30kHz (pattern2)/120kHz

METHOD OF CONFIGURING CONTROL RESOURCE SET, NETWORK EQUIPMENT AND TERMINAL

CROSS-REFERENCE TO RELATED APPLICATION

The present application is the U.S. national phase of PCT Application No. PCT/CN2018/100428 filed on Aug. 14, 2018, which claims a priority of the Chinese patent application No. 201710814531.8 filed in China on Sep. 11, 2017 and a priority of the Chinese patent application No. 201710819467.2 filed in China on Sep. 12, 2017, disclosures of which are incorporated herein by reference in their entireties.

TECHNICAL FIELD

The present disclosure relates to the field of communication technology, in particular to a method of configuring a control resource set (CORESET), a network equipment and a terminal.

BACKGROUND

In a $5^{th}$ generation (5G) communication system (also called new radio (NR) system), network equipment needs to transmit synchronized signal block (SS block or SSB) to terminals for purposes of synchronization, system information acquisition, measurement and evaluation or the like. An SS block is composed of a new radio synchronized signal (NR-SS) and a new radio physical broadcast channel (NR-PBCH). The NR-SS includes a new radio primary synchronized signal (NR-PSS) and a new radio secondary synchronized signal (NR-SSS).

SUMMARY

In a first aspect, an embodiment of the present disclosure provides a method of configuring a control resource set (CORESET). The method is applied to a network equipment side and includes: configuring, for a terminal, indication information for indicating time-frequency domain position information of the CORESET of data information; where the indication information includes: a first indication field for indicating downlink numerology information and a second indication field for indicating a CORESET configuration codebook; and transmitting the indication information to the terminal.

In a second aspect, an embodiment of the present disclosure further provides a network equipment. The network equipment includes: a configuration module, configured to configure, for a terminal, indication information for indicating time-frequency domain position information of a control resource set (CORESET) for data information; where the indication information includes: a first indication field for indicating downlink numerology information and a second indication field for indicating a CORESET configuration codebook; and a transmission module, configured to transmit the indication information to the terminal.

In a third aspect, an embodiment of the present disclosure further provides a network equipment. The network equipment includes: a processor, a memory and a computer program stored in the memory and configured to be executed by the processor, where the processor is configured to execute the computer program, to implement steps of the foregoing method.

In a fourth aspect, an embodiment of the present disclosure provides a method of configuring a CORESET. The method is applied to a terminal side and includes: receiving indication information transmitted by network equipment; where the indication information includes: a first indication field for indicating downlink numerology information and a second indication field for indicating a CORESET configuration codebook; and determining time-frequency domain position information of the CORESET of data information according to the first indication field and the second indication field.

In a fifth aspect, an embodiment of the present disclosure provides a terminal. The terminal includes: a reception module, configured to receive indication information transmitted by network equipment; where the indication information includes: a first indication field for indicating downlink numerology information and a second indication field for indicating a CORESET configuration codebook; and a processing module, configured to determine time-frequency domain position information of the CORESET of data information according to the first indication field and the second indication field.

In a sixth aspect, an embodiment of the present disclosure further provides a terminal. The terminal includes: a processor, a memory and a computer program stored in the memory and configured to be executed by the processor, where the processor is configured to execute the computer program, to implement steps of the foregoing method.

In a seventh aspect, an embodiment of the present disclosure provides a computer readable storage medium storing therein a computer program, where the computer program is configured to be executed by a processor, to implement steps of the foregoing methods.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person ordinary skilled in the art can obtain other drawings based on the described drawings without any creative efforts.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thorough, and will fully convey the scope of the present disclosure to those skilled in the art.

Terms "first", "second" and the like in the specification and claims of this disclosure are adopted not to describe a specific sequence or order but to distinguish similar objects. It should be understood that data used like this may be interchanged under a proper condition for implementation of the embodiments of the disclosure described here in a sequence apart from those shown or described here. In addition, terms "include" and "have" and any variant thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment. It is further noted, legends are consistent throughout the drawings.

Figure 1:
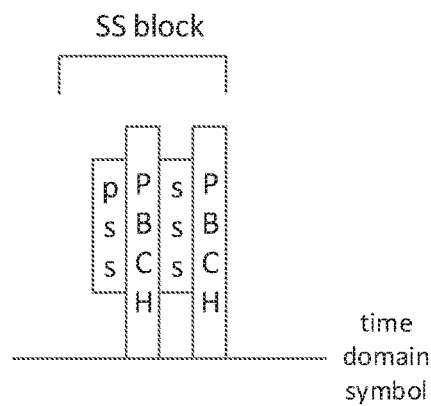
FIG. 1 is a schematic diagram of time-frequency domain resource of a SS block.

In a $5^{th}$ generation (5G) communication system (also called new radio (NR) system), a network equipment needs to transmit synchronized signal and PBCH block (SS block or SSB) to terminals for purposes of synchronization, system information acquisition, measurement and evaluation or the like. An SS block is composed of a new radio synchronized signal (NR-SS) and a new radio physical broadcast channel (NR-PBCH). The NR-SS includes a new radio primary synchronized signal (NR-PSS) and a new radio secondary synchronized signal (NR-SSS). As shown in FIG. 1, in an SS block including 4 orthogonal frequency division multiplexing (OFDM) symbols, the NR-SS and the NR-PBCH are mapped in the following order: NR-PSS, NR-PBCH, NR-SSS, NR-PBCH. The NR-PSS and NR-SSS respectively occupy one OFDM symbol in the time domain, and 12 resource blocks (RBs) in the frequency domain. The NR-PBCH signal occupies two OFDM symbols in the time domain and 24 RBs in the frequency domain.

Further, in NR system, CORESET is introduced. One CORESET includes multiple search spaces. There are a plurality of candidate positions for transmitting physical downlink control channel (PDCCH) in a search space. Currently, supported CORESET duration includes 1, 2 or 3 consecutive OFDM symbols in the time domain. Every 2 or 6 resource element groups (REGs) form one REG bundle. Network equipment allocates resources for PDCCH in a minimum unit of a REG bundle. One REG is defined as one OFDM symbol in the time domain and one physical resource block (PRB) in the frequency domain. One CORESET may include a plurality of control channel elements (CCEs), and one CCE includes 6 REGs. A quantity of CCEs included in one CORESET is called aggregation level (AL). For example, a CORESET occupying two symbols in the time domain and 24 RBs in the frequency domain has an AL of 8.

Figure 2:
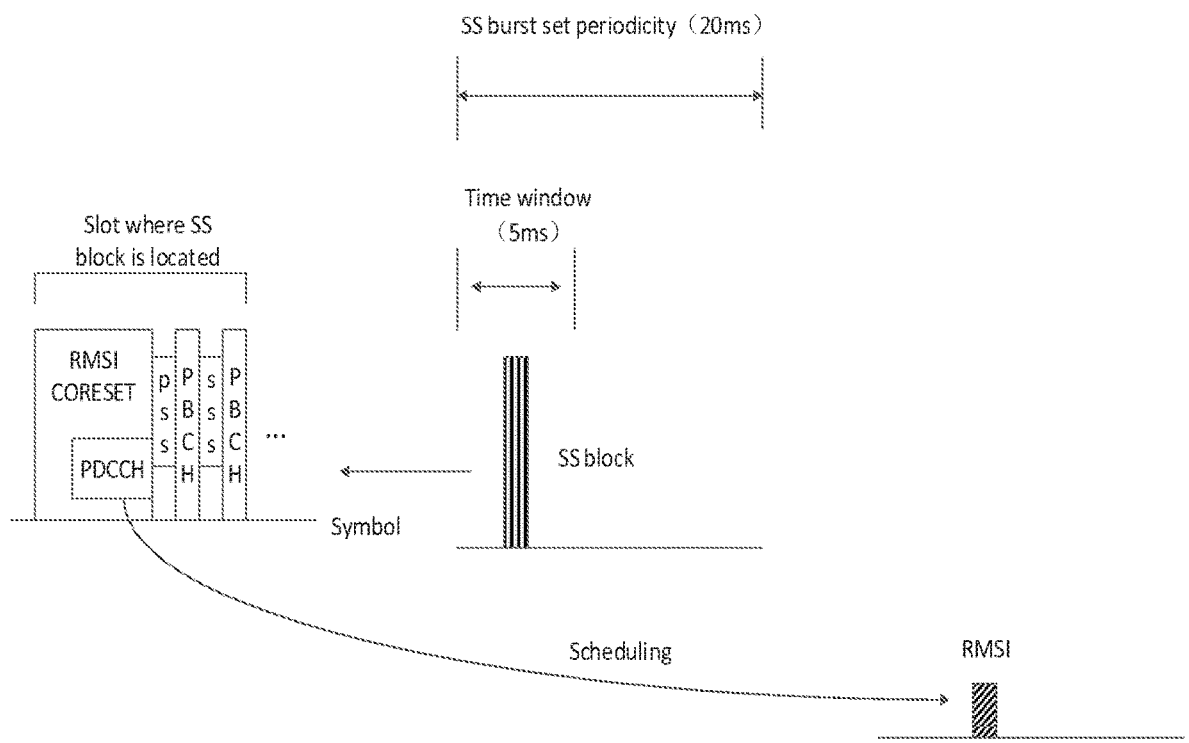
FIG. 2 is a schematic diagram of time-frequency domain resources of a CORESET and a SS block.

The NR-PBCH signal is primarily used to acquire a system master information block (MIB). The MIB carries configuration information of CORESET. With the configuration information, time-frequency domain positions of the CORESET may be informed to a terminal. The terminal performs blind detection of CORESET at these time-frequency domain positions, to acquire downlink control information (DCI) for scheduling data part, which may be used for scheduling remaining minimum system information (RMSI), etc. In addition, the MIB further carries downlink (DL) numerology information, which is used to indicate whether numerology information for SS block is consistent with numerology information for RMSI, msg 2/4 used for initial access, and broadcast other system information (OSI). Taking a CORESET possibly containing DCI used to schedule RMSI (RMSI CORESET, for short) for example, as shown in FIG. 2, a certain NR-PBCH of transmitted SS block contains configuration information of a RMSI CORESET. The configuration information indicates that the RMSI CORESET is time division multiplexed (TDM) with a SS block, located in first two OFDM symbols of the SS block and has an AL of 8. The RMSI CORESET includes a PDCCH used for scheduling RMSI, that is, includes DCI used for scheduling RMSI.

Multiple numerologies are supported in an NR system. For a scenario in which a system bandwidth lies above 6 GHz, a terminal supports a subcarrier spacing of 60/120/240 kHz; and for a scenario in which a system bandwidth lies below 6 GHz, a terminal supports a subcarrier spacing of 15/30/60 kHz. When the subcarrier spacing is 15/30/120/240 kHz, a SS block may be transmitted. When the subcarrier spacing is 30 kHz, the SS block may be designed in two different patterns. A pattern 1 is configure for LTE-NR coexistence, while a pattern 2 is configured for ultra-reliable low latency communications (URLLC) service. When the subcarrier spacing is 15/30/60/120 kHz, data may be transmitted. However, numerology for data may be different from that for SS block. Numerology for RMSI CORESET should be kept consistent with numerology for corresponding RMSI. Due to the fact that SS block and RMSI CORESET having a same numerology or different numerologies may have many combinations, and a designed position of SS block is different when numerology is different, the configuration of RMSI CORESET may be very complicated. Accordingly, an indication of RMSI CORESET configuration may take up many bits in the MIB, thereby increasing the bit overhead of MIB.

To address the foregoing technical problem, an embodiment of the present disclosure provides a method of configuring a CORESET.

Figure 3:
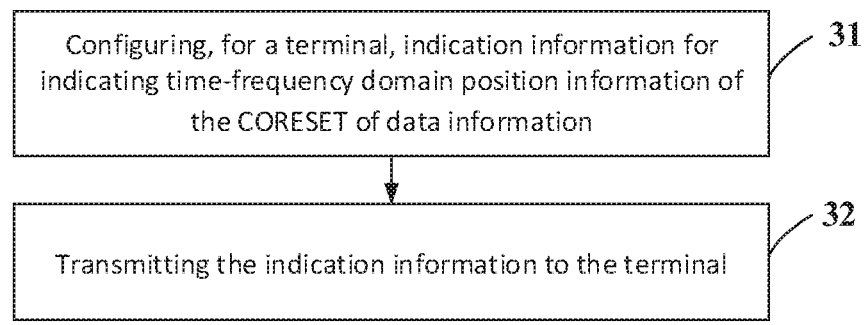
FIG. 3 is a schematic flow diagram of a method of configuring a CORESET applied to a network equipment side according to an embodiment of the present disclosure.

The method of configuring a CORESET provided by the embodiment of the present disclosure is applied to a network equipment side, and, as shown in FIG. 3, includes specifically the following steps.

Step 31 includes: configuring, for a terminal, indication information for indicating time-frequency domain position information of the CORESET of data information.

The indication information includes: a first indication field for indicating downlink numerology information and a second indication field for indicating a CORESET configuration codebook. In specific, the indication information may be carried in a system MIB, that is, the first indication field and the second indication field are carried in the MIB.

Step 32 includes: transmitting the indication information to the terminal.

In specific, an SS block carrying the system MIB is transmitted to a terminal. That is, the indication information is transmitted to a terminal via broadcast information.

The first indication field includes at least one of: first indication information for indicating whether numerology information for the CORESET is the same as numerology information for the SS block; or second indication information for indicating the numerology information for the CORESET.

In specific, when the numerology information for the SS block is first numerology information, if the second indication information is a first value, the second indication information indicates that the numerology information for the CORESET is second numerology information corresponding to the first numerology information. In specific, the numerology information includes: subcarrier spacing, cyclic prefix and the like. Taking subcarrier spacing for example, when the subcarrier spacing for the SS block is a first subcarrier spacing, if the second indication information is a first value, the second indication information indicates that the subcarrier spacing for the CORESET is a second subcarrier spacing corresponding to the first subcarrier spacing. For a specific mapping relationship between the subcarrier spacing for CORESET (e.g., RMSI CORESET) and the subcarrier spacing for SS block, refer to the following table 1:

TABLE 1

| Subcarrier spacing for SS block (kHz) | Subcarrier spacing for RMSI CORESET (kHz) |
|---|---|
| 15 | 15 |
| 30 | 15 |
| 30 | 30 |
| 30 | 60 |
| 120 | 60 |
| 120 | 120 |
| 240 | 60 |
| 240 | 120 |

Taking RMSI CORESET for example, when a subcarrier spacing for SS block is 15 kHz, if the second indication information is one of 0 and 1, the second indication information indicates that the subcarrier spacing for the CORESET is 15 kHz which corresponds to the 15 kHz. When a subcarrier spacing for SS block is 30 kHz, if the second indication information includes 2 bits, the second indication information may indicate specifically that the subcarrier spacing for the CORESET is 15 kHz, 30 kHz or 60 kHz which corresponds to the 30 kHz; if the second indication information includes 1 bit, it cannot indicate the subcarrier spacing for the CORESET, thus the terminal has to perform blind detection. When a subcarrier spacing for SS block is 120 kHz, if the second indication information is one of 0 and 1, the second indication information indicates that the subcarrier spacing for the CORESET is 60 kHz which corresponds to the 120 kHz; if the second indication information is the other of 0 and 1, the second indication information indicates that the subcarrier spacing for the CORESET is 120 kHz which corresponds to the 120 kHz. When a subcarrier spacing for SS block is 240 kHz, if the second indication information is one of 0 and 1, the second indication information indicates that the subcarrier spacing for the CORESET is 60 kHz which corresponds to the 240 kHz; if the second indication information is the other of 0 and 1, the second indication information indicates that the subcarrier spacing for the CORESET is 120 kHz which corresponds to the 240 kHz.

Further, when a subcarrier spacing for SS block is 15 kHz, if the first indication information is one of 0 and 1, the first indication information indicates that the subcarrier spacing for CORESET is the same as the subcarrier spacing for SS block. When a subcarrier spacing for SS block is 30 kHz, if the first indication information is one of 0 and 1, the first indication information indicates that the subcarrier spacing for CORESET is the same as the subcarrier spacing for SS block; if the first indication information is the other of 0 and 1, it cannot indicate the subcarrier spacing for the CORESET, thus the terminal has to perform blind detection. When a subcarrier spacing for SS block is 120 kHz, if the first indication information is one of 0 and 1, the first indication information indicates that the subcarrier spacing for CORESET is the same as the subcarrier spacing for SS block; if the first indication information is the other of 0 and 1, the first indication information indicates that the subcarrier spacing for CORESET is different from the subcarrier spacing for SS block. When a subcarrier spacing for SS block is 240 kHz, if the first indication information is one of 0 and 1, the first indication information indicates that the subcarrier spacing for CORESET is the same as the subcarrier spacing for SS block; if the first indication information is the other of 0 and 1, it cannot indicate the subcarrier spacing for the CORESET, thus the terminal has to perform blind detection.

Further, the CORESET configuration codebook includes at least one of following information: a time domain position of the CORESET, a time domain duration of the CORESET, a frequency domain position of the CORESET, a frequency domain width of the CORESET, an AL of the CORESET, a distribution mode of the CORESET or a multiplexing pattern with SS block.

In specific, the CORESET configuration codebook includes: a first configuration codebook in which numerology information for the CORESET is the same as numerology information for an SS block, or a second configuration codebook in which the numerology information for the CORESET is different from the numerology information for the SS block.

The second indication field indicates, when the second indication field denotes a first value of the first configuration codebook, that the CORESET is frequency division multiplexed with the SS block and the CORESET occupies two first time domain symbols of a transmission resource of the SS block.

The second indication field indicates, when the second indication field denotes a second value of the first configuration codebook, that the CORESET is frequency division multiplexed with the SS block and the CORESET occupies three first time domain symbols of the transmission resource of the SS block.

The second indication field indicates, when the second indication field denotes a third value of the first configuration codebook, that the CORESET is frequency division multiplexed with the SS block and the CORESET occupies one first time domain symbol of the transmission resource of the SS block.

The second indication field indicates, when the second indication field denotes a fourth value of the first configuration codebook, that the CORESET is time division multiplexed with the SS block, and the CORESET overlaps with a frequency domain resource of the SS block and occupies two first other time domain symbols of a slot where the SS block is located.

The second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located.

The second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located.

The second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located.

The first time domain symbol is a candidate time domain symbol used to receive the SS block, and the first other time domain symbol is a time domain symbol, other than a candidate transmission position of the SS block, an Uplink (UL) control and a guard period, of the slot where the SS block is located.

In specific, the RMSI CORESET scheme and codebook design according to the embodiment of the present disclosure are designed based on following constraints: AL is at least 8, a user minimum receiving bandwidth is 10 M for bands below 6 GHz, and a user minimum receiving bandwidth is 100 M for bands above 6 GHz. In addition, the scheme and similar design concept may be used directly and expanded in circumstances with other constraints of AL, user minimum receiving bandwidth or system bandwidth, and may support all kinds of combinations of SS block and numerology permitted by system bandwidth, as shown in following table 2:

TABLE 2

Figure 4A:
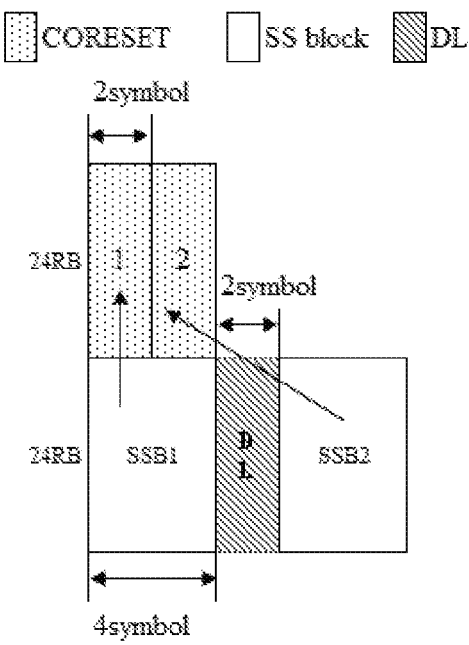
FIG. 4a to FIG. 4b are respectively schematic diagrams of time-frequency domain resources of a CORESET and a SS block in a first scenario.
Figure 4B:
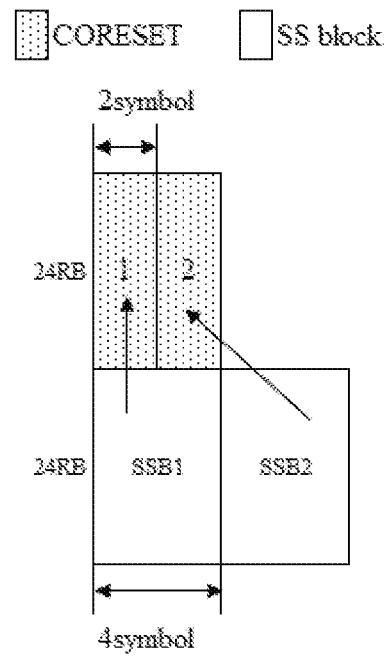
Figure 5:
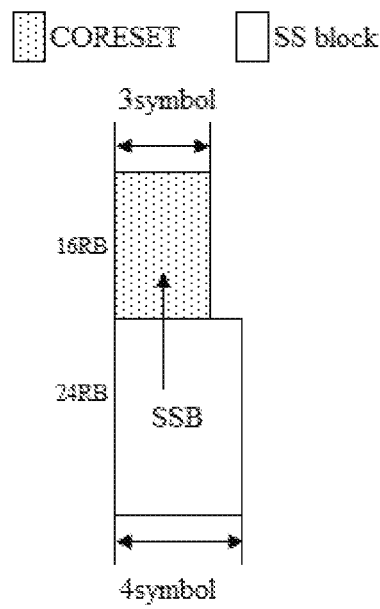
FIG. 5 is a schematic diagram of time-frequency domain resources of a CORESET and a SS block in a second scenario.
Figure 6A:
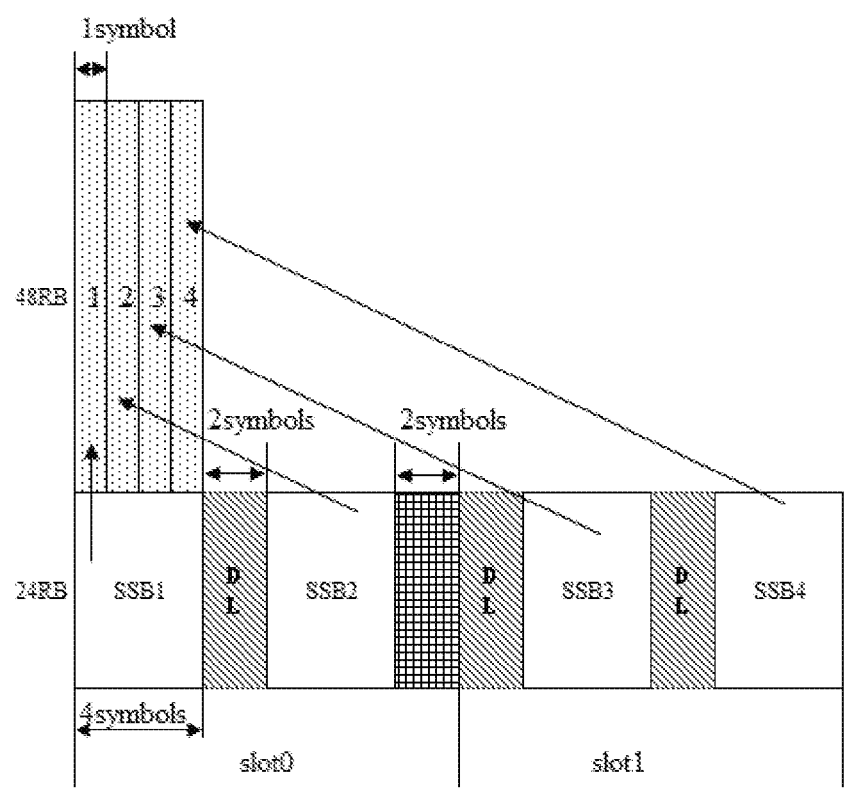
FIG. 6a to FIG. 6b are respectively schematic diagrams of time-frequency domain resources of a CORESET and a SS block in a third scenario.

| Second indication field (3 bits) | Multiplexing pattern | Application scenario |
| --- | --- | --- |
| First value, e.g., 000 | FDM | subcarrier spacing for SS block is: 15 kHz, subcarrier spacing for CORESET is: 15 kHz subcarrier spacing for SS block is: 30 kHz (pattern2), subcarrier spacing for CORESET is: 30 kHz, as shown in FIG. 4a subcarrier spacing for SS block is: 30 kHz (pattern1), subcarrier spacing for CORESET is: 30 kHz subcarrier spacing for SS block is: 120 kHz, subcarrier spacing for CORESET is: 120 kHz, as shown in FIG. 4b |
| Second value, e.g., 001 | FDM | subcarrier spacing for SS block is: 15 kHz, subcarrier spacing for CORESET is: 15 kHz subcarrier spacing for SS block is: 30 kHz (pattern1), subcarrier spacing for CORESET is: 30 kHz; subcarrier spacing for SS block is: 30 kHz (pattern2), subcarrier spacing for CORESET is: 30 kHz subcarrier spacing for SS block is: 120 kHz, subcarrier spacing for CORESET is: 120 kHz, as shown in FIG. 5 |
| Third value, e.g., 010 | FDM | subcarrier spacing for SS block is: 15 kHz, subcarrier spacing for CORESET is: 15 kHz subcarrier spacing for SS block is: 30 kHz (pattern2), subcarrier spacing for CORESET is: 30 kHz (requiring a user minimum receiving bandwidth of at least 20M), as shown in FIG. 6a subcarrier spacing for SS block is: 120 kHz, subcarrier spacing for CORESET is: 120 kHz subcarrier spacing for SS block is: 30 kHz (pattern1), |

TABLE 2-continued

Figure 6B:
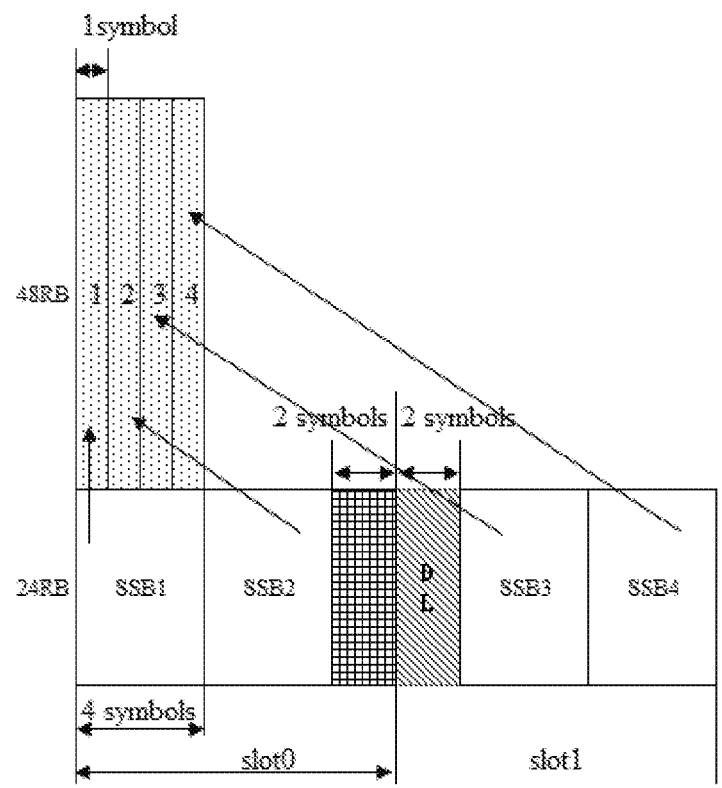
Figure 7A:
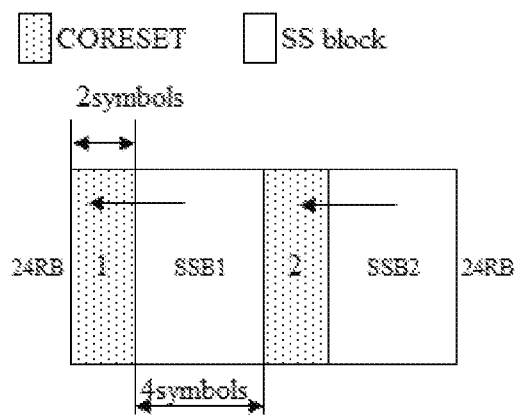
FIG. 7a to FIG. 7b are respectively schematic diagrams of time-frequency domain resources of a CORESET and a SS block in a fourth scenario.
Figure 7B:
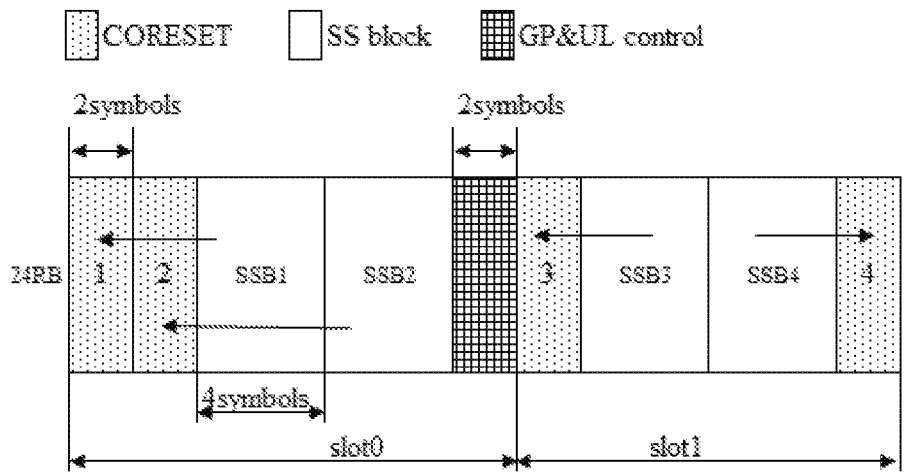
Figure 8A:
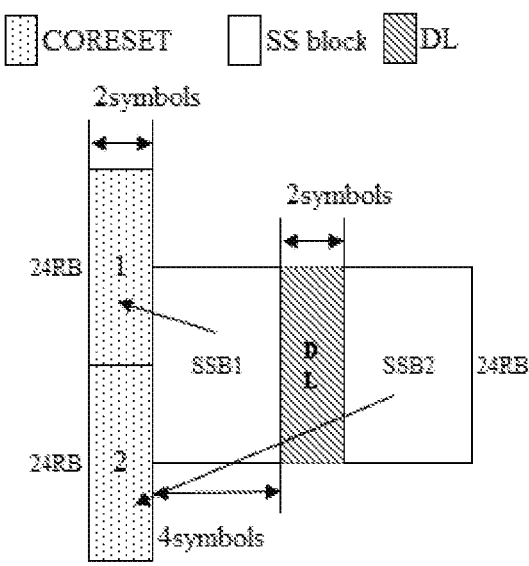
FIG. 8a to FIG. 8b are respectively schematic diagrams of time-frequency domain resources of a CORESET and a SS block in a fifth scenario.
Figure 8B:
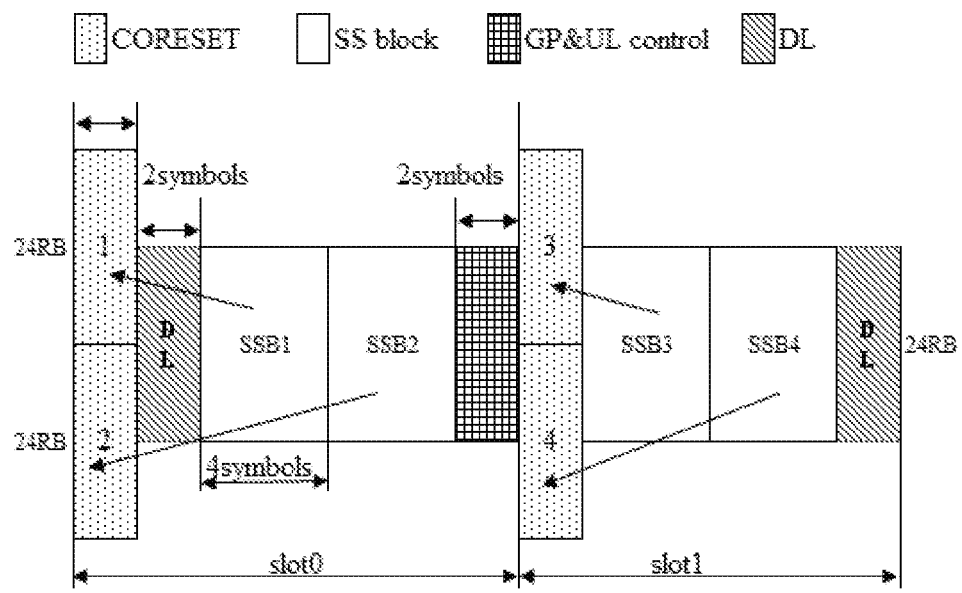
Figure 9A:
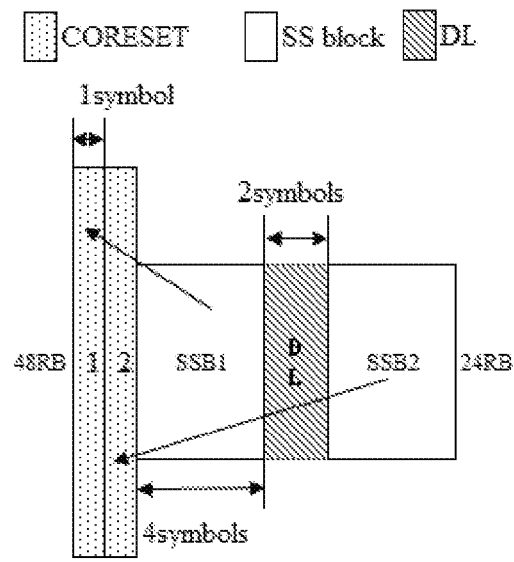
FIG. 9a to FIG. 9b are respectively schematic diagrams of time-frequency domain resources of a CORESET and a SS block in a sixth scenario.
Figure 9B:
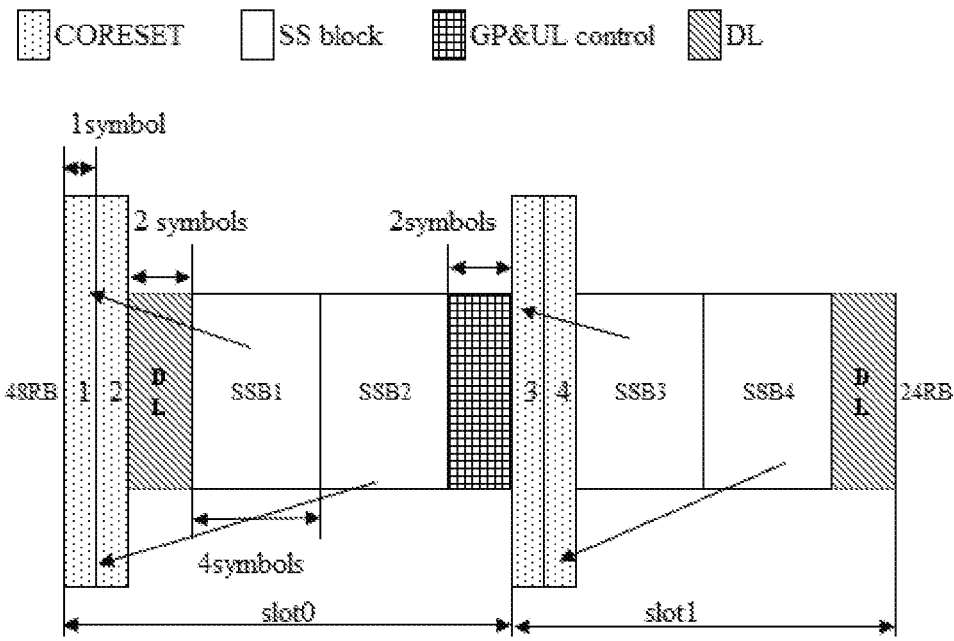
Figure 10A:
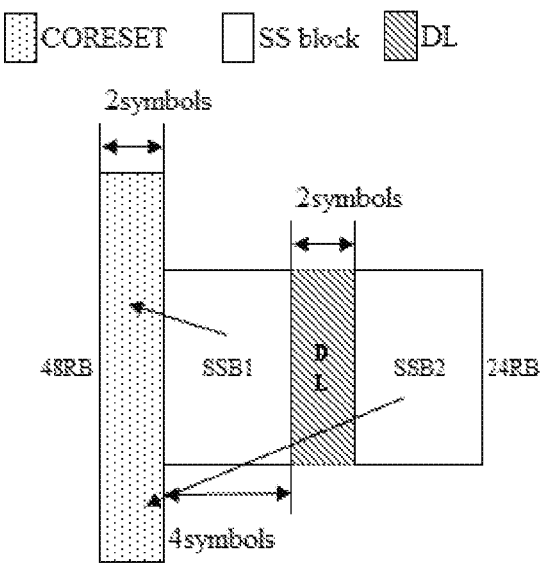
FIG. 10a to FIG. 10b are respectively schematic diagrams of time-frequency domain resources of a CORESET and a SS block in a seventh scenario.
Figure 10B:
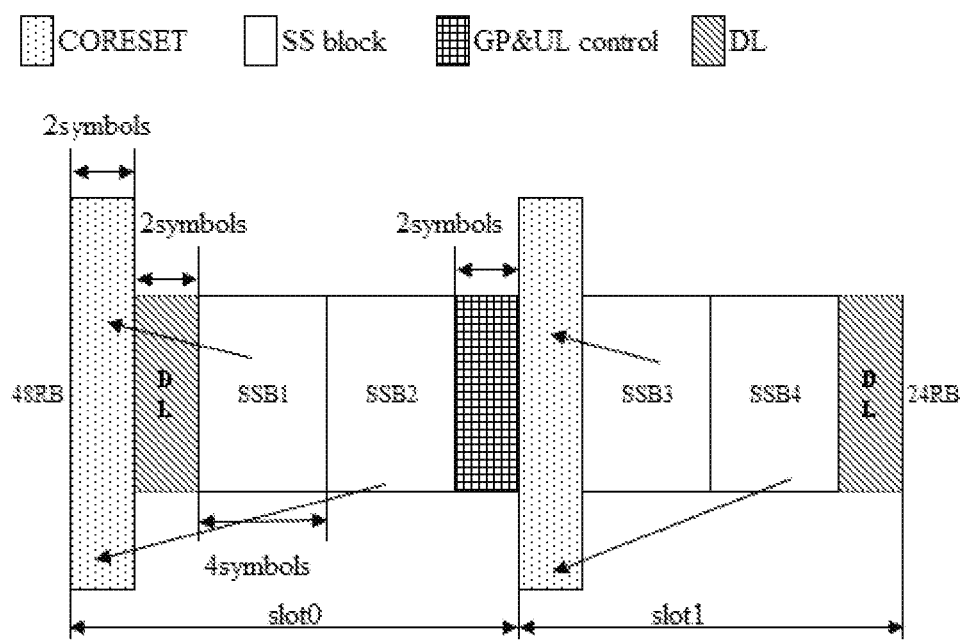

| Second indication field (3 bits) | Multiplexing pattern | Application scenario |
|---|---|---|
| Fourth value, e.g., 011 | TDM | subcarrier spacing for CORESET is: 30 kHz (requiring a user minimum receiving bandwidth of at least 20M), as shown in FIG. 6b subcarrier spacing for SS block is: 15 kHz, subcarrier spacing for CORESET is: 15 kHz subcarrier spacing for SS block is: 30 kHz (pattern2), subcarrier spacing for CORESET is: 30 kHz, as shown in FIG. 7a subcarrier spacing for SS block is: 30 kHz (pattern1), subcarrier spacing for CORESET is: 30 kHz subcarrier spacing for SS block is: 120 kHz, subcarrier spacing for CORESET is: 120 kHz, as shown in FIG. 7b |
| Fifth value, e.g., 100 | TDM | subcarrier spacing for SS block is: 15 kHz, subcarrier spacing for CORESET is: 15 kHz subcarrier spacing for SS block is: 30 kHz (pattern2), subcarrier spacing for CORESET is: 30 kHz, as shown in FIG. 8a subcarrier spacing for SS block is: 30 kHz (pattern1), subcarrier spacing for CORESET is: 30 kHz subcarrier spacing for SS block is: 120 kHz, subcarrier spacing for CORESET is: 120 kHz, as shown in FIG. 8b |
| Sixth value, e.g., 101 | TDM | subcarrier spacing for SS block is: 15 kHz, subcarrier spacing for CORESET is: 15 kHz subcarrier spacing for SS block is: 30 kHz (pattern2), subcarrier spacing for CORESET is: 30 kHz (requiring a user minimum receiving bandwidth of at least 20M), as shown in FIG. 9a subcarrier spacing for SS block is: 120 kHz, subcarrier spacing for CORESET is: 120 kHz subcarrier spacing for SS block is: 30 kHz (pattern1), subcarrier spacing for CORESET is: 30 kHz (requiring a user minimum receiving bandwidth of at least 20M), as shown in FIG. 9b |
| Seventh value, e.g., | TDM | subcarrier spacing for SS block is: 15 kHz, |
| 110 | | subcarrier spacing for CORESET is: 15 kHz subcarrier spacing for SS block is: 30 kHz (pattern2), subcarrier spacing for CORESET is: 30 kHz (requiring a user minimum receiving bandwidth of at least 20M), as shown in FIG. 10a subcarrier spacing for SS block is: 120 kHz, subcarrier spacing for CORESET is: 120 kHz, subcarrier spacing for SS block is: 30 kHz (pattern1), subcarrier spacing for CORESET is: 30 kHz (requiring a user minimum receiving bandwidth of at least 20M), as shown in FIG. 10b |
| Eighth value, e.g., 111 | | Reserved |

For example, assuming that numerology for SS block is the same as numerology for CORESET (denoted as type1), there are 7 different CORESET schemes; assuming that numerology for SS block is different from numerology for CORESET (denoted as type2), there are 6 different CORESET schemes, thus there are 13 schemes in total. Here, if configurations of the 13 CORESET schemes are directly indicated in the MIB, 4 bits are required. Therefore, it is considered to use DL numerology information to jointly configure the CORESET schemes. Through selecting configurations for type1 or type2 by using DL numerology information, overhead for configuring CORESET schemes is reduced to 3 bits of MIB. The terminal performs a blind detection of SS block on carriers to determine numerology for SS block, e.g., 15 kHz. The terminal decodes MIB information carried in the SS block to obtain the first indication field (DL numerology information) and the second indication field (RMSI CORESET scheme configuration information). For example, RMSI CORESET scheme configuration information is 000, and DL numerology information indicates that numerologies for the SS block and CORESET are the same. As a result, UE determines that CORESET scheme employed by the base station is the first scheme among the 7 possible CORESET schemes for type1. Since at this time the DL numerology information may indicate the subcarrier spacing for CORESET, according to the correspondence between the subcarrier spacing for SS block and the subcarrier spacing for CORESET in the application scenario column of the above table, it may be directly determined that the CORESET scheme is a specific configuration of certain scheme for type1. In this way, a specific configuration of a specific scheme for type1 may be determined according to DL numerology information and RMSI CORESET configuration information, and the terminal searches for CORESET according to time-frequency positions of the specific configuration.

Alternatively, DL numerology information is used to jointly configure the CORESET schemes, the bit 111 is reserved to indicate that multiple SS blocks share one CORESET, and by default, these SS blocks are transmitted repeatedly. The shared CORESET may occupy one or more symbols in the time domain, and may have multiple possible time domain positions. The terminal performs a blind detection of SS block on carriers to determine numerology for SS block. The terminal decodes MIB information carried in the SS block to obtain the DL numerology information, and the RMSI CORESET scheme configuration information, e.g., 111. The DL numerology information indicates that numerologies for the SS block and CORESET are the same or different. As a result, UE determines that CORESET scheme is the reserved eighth scheme for type1 or type2 and recognizes that SS blocks configured by using this CORESET scheme are transmitted repeatedly. For example, for a high frequency band above 6 GHz, a series of 8 SS blocks are transmitted repeatedly; for a low frequency band below 6 GHz, a series of 2 SS blocks are transmitted repeatedly.

Further, the second indication field indicates, when the second indication field denotes a first value of the second configuration codebook, that the CORESET is frequency division multiplexed with the SS block and the CORESET occupies one second time domain symbol within a range of first time domain symbols where the SS block is located.

The second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located.

The second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located.

The second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located.

The second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located.

The second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located.

The first time domain symbol is a candidate time domain symbol used to receive the SS block, the second time domain symbol is a candidate time domain symbol used to receive the CORESET, and the second other time domain symbol is an time domain symbol, other than a candidate transmission position of the SS block, an Uplink (UL) control and a guard period, of the slot where the CORESET is located.

In specific, the RMSI CORESET scheme and codebook design according to the embodiment of the present disclosure are designed based on following constraints: AL is at least 8, a user minimum receiving bandwidth is 10 M for bands below 6 GHz, and a user minimum receiving bandwidth is 100 M for bands above 6 GHz. In addition, the scheme and similar design concept may be used directly and expanded in circumstances with other constraints of AL, user minimum receiving bandwidth or system bandwidth, and may support all kinds of combinations of SS block and numerology permitted by system bandwidth, as shown in following table 3:

TABLE 3

Figure 11A:
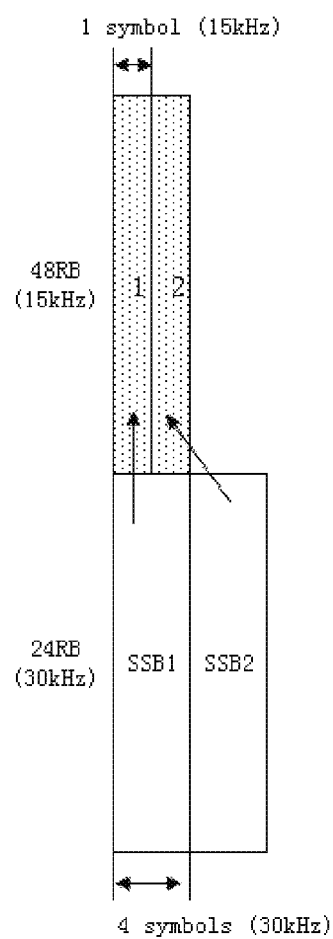
FIG. 11a to FIG. 11c are respectively schematic diagrams of time-frequency domain resources of a CORESET and a SS block in an eighth scenario.
Figure 11B:
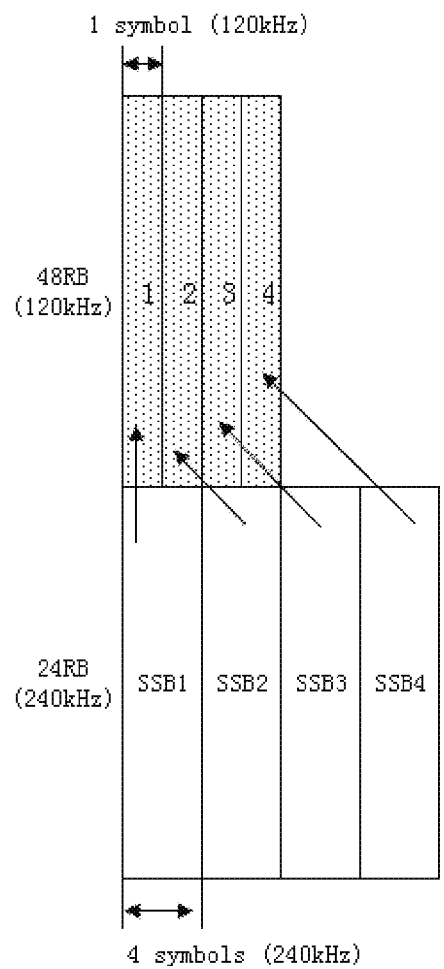
Figure 11C:
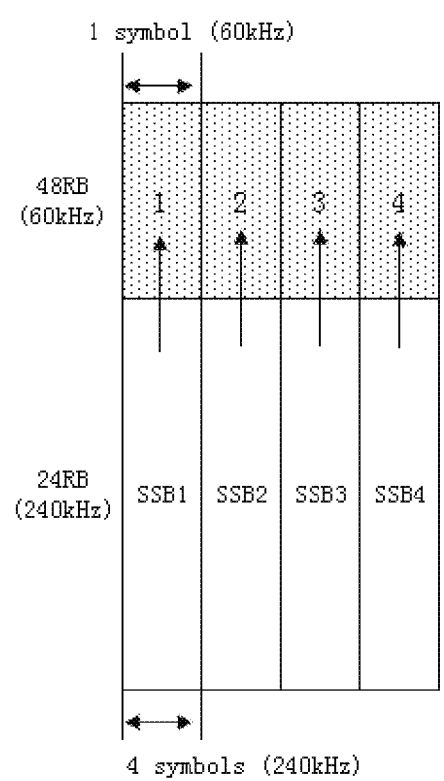
Figure 12:
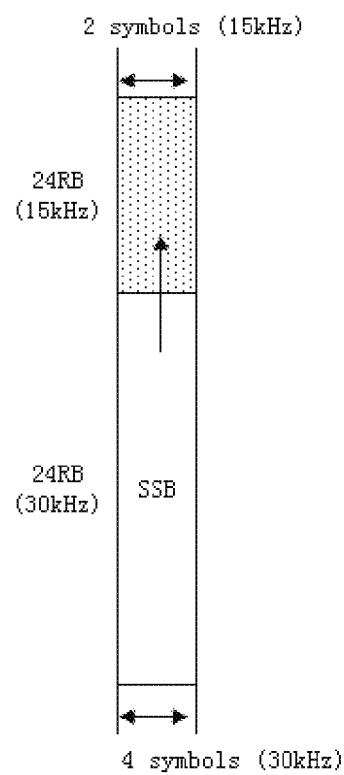
FIG. 12 is a schematic diagram of time-frequency domain resources of a CORESET and a SS block in a ninth scenario.
Figure 13A:
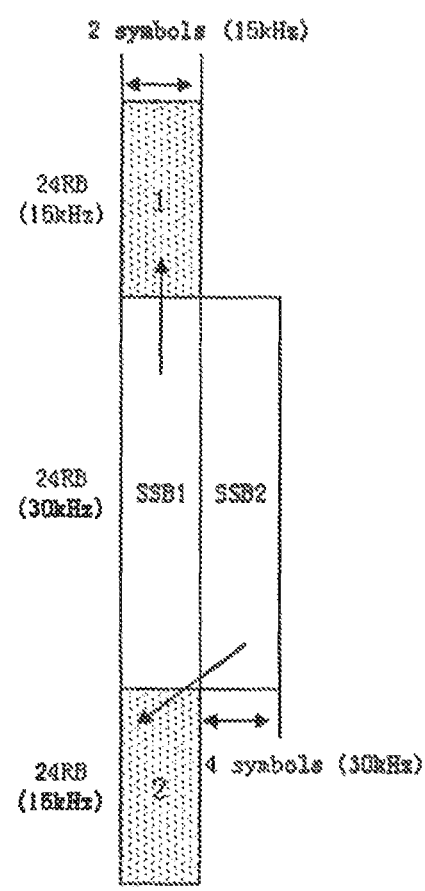
FIG. 13a to FIG. 13c are respectively schematic diagrams of time-frequency domain resources of a CORESET and a SS block in a tenth scenario.
Figure 13B:
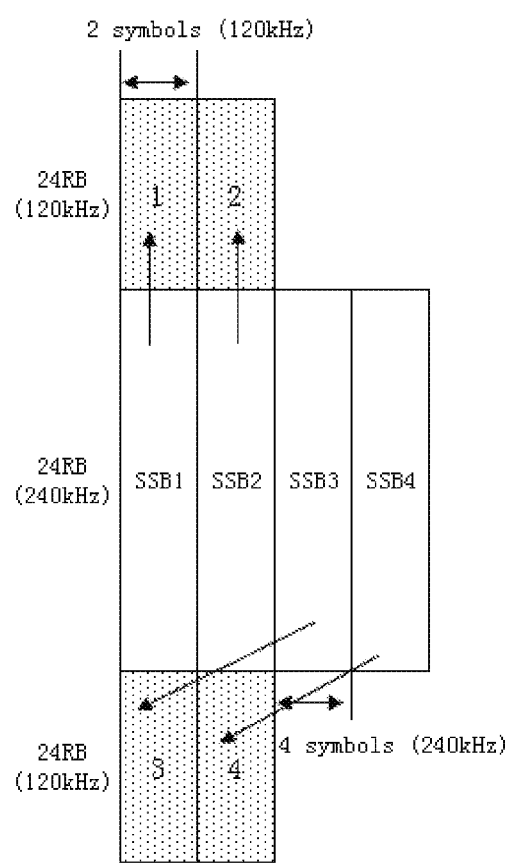
Figure 13C:
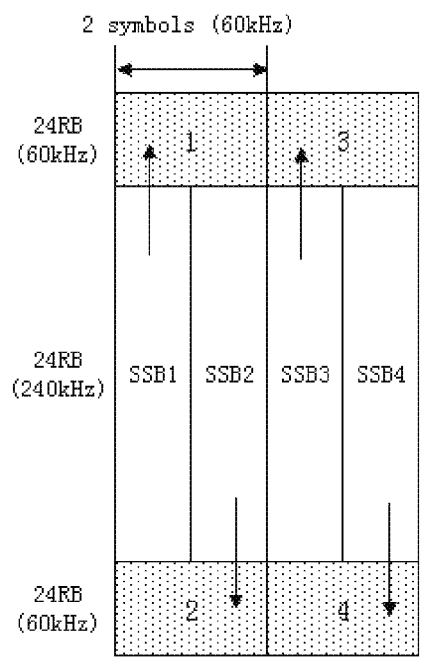

| Second indication field (3 bits) | Multiplexing pattern | Application scenario |
| --- | --- | --- |
| First value, e.g., 000 | FDM | subcarrier spacing for SS block is: 30 kHz (pattern1), subcarrier spacing for CORESET is: 15 kHz subcarrier spacing for SS block is: 120 kHz, subcarrier spacing for CORESET is: 60 kHz, as shown in FIG. 11a subcarrier spacing for SS block is: 240 kHz, subcarrier spacing for CORESET is: 120 kHz, as shown in FIG. 11b subcarrier spacing for SS block is: 240 kHz, subcarrier spacing for CORESET is: 60 kHz, as shown in FIG. 11c |
| Second. value, e.g., 001 | FDM | subcarrier spacing for SS block is: 30 kHz (pattern1), subcarrier spacing for CORESET is: 15 kHz subcarrier spacing for SS block is: 120 kHz, subcarrier spacing for CORESET is: 60 kHz subcarrier spacing for SS block is: 240 kHz, subcarrier spacing for CORESET is: 120 kHz, as shown in FIG. 12 |
| Third value, e.g.,010 | FDM | subcarrier spacing for SS block is: 30 kHz (pattern1), subcarrier spacing for CORESET is: 15 kHz subcarrier spacing for SS block is: 120 kHz, subcarrier spacing for CORESET is: 60 kHz, as shown in FIG. 13a subcarrier spacing for SS block is: 240 kHz, subcarrier spacing for CORESET is: 120 kHz, as shown in FIG. 13b subcarrier spacing for SS block is: 240 kHz, subcarrier spacing for CORESET is: 60 kHz, as shown in FIG. 13c |

TABLE 3-continued

Figure 14A:
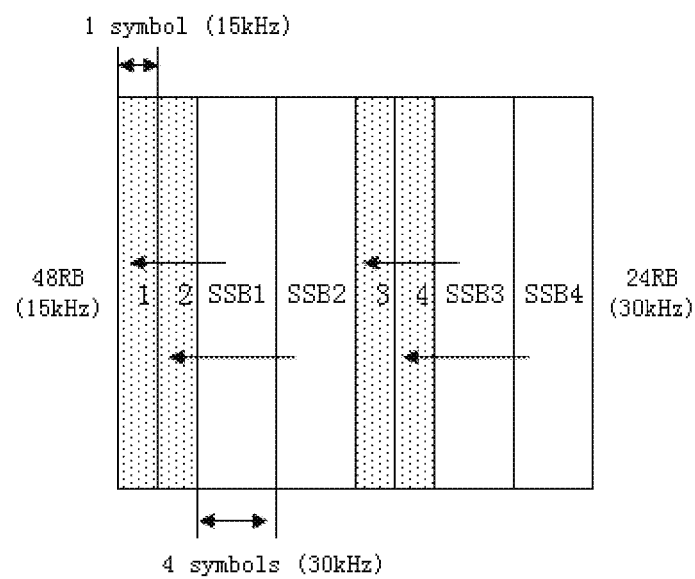
FIG. 14a to FIG. 14c are respectively schematic diagrams of time-frequency domain resources of a CORESET and a SS block in an eleventh scenario.
Figure 14B:
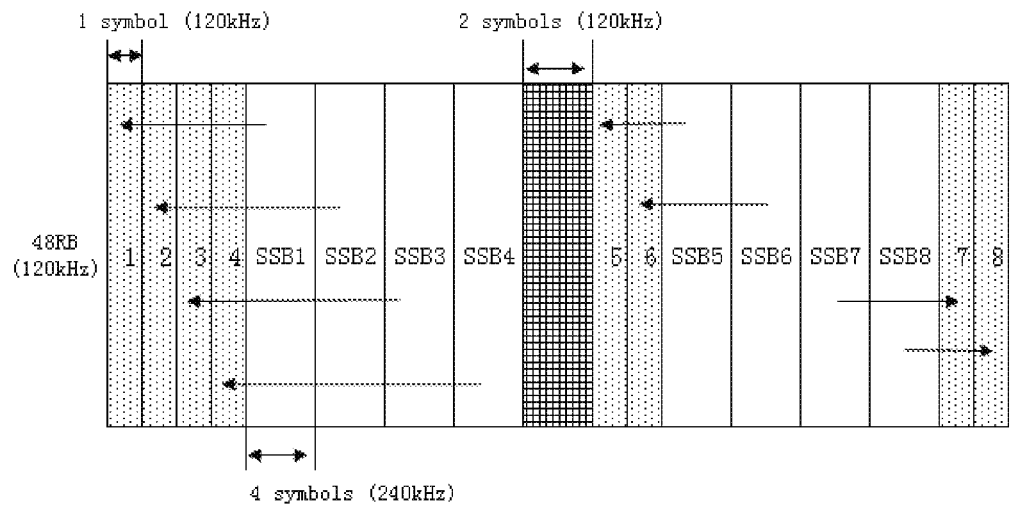
Figure 14C:
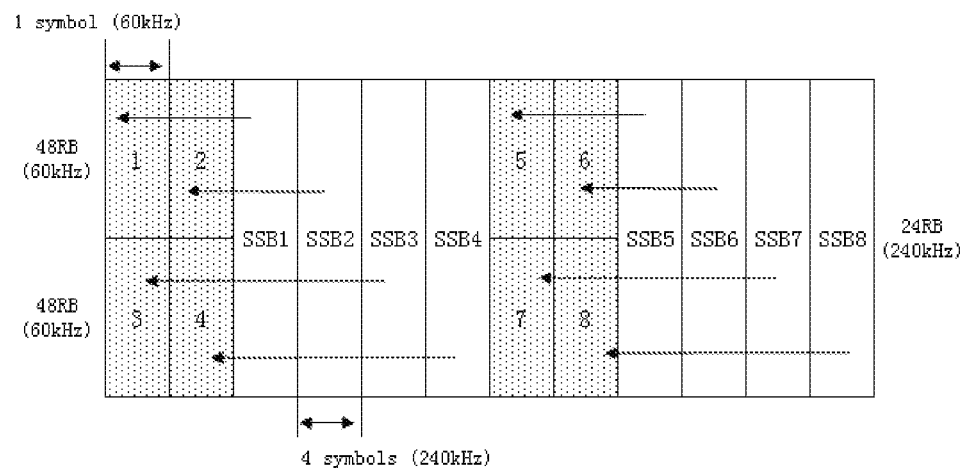
Figure 15A:
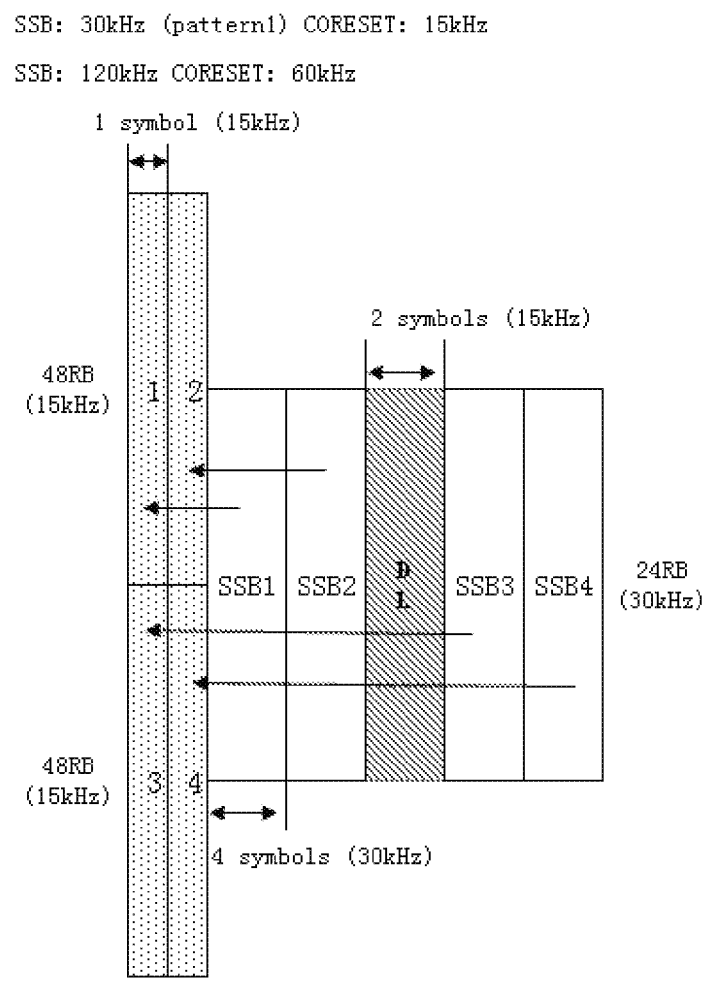
FIG. 15a to FIG. 15c are respectively schematic diagrams of time-frequency domain resources of a CORESET and a SS block in a twelfth scenario.
Figure 15B:
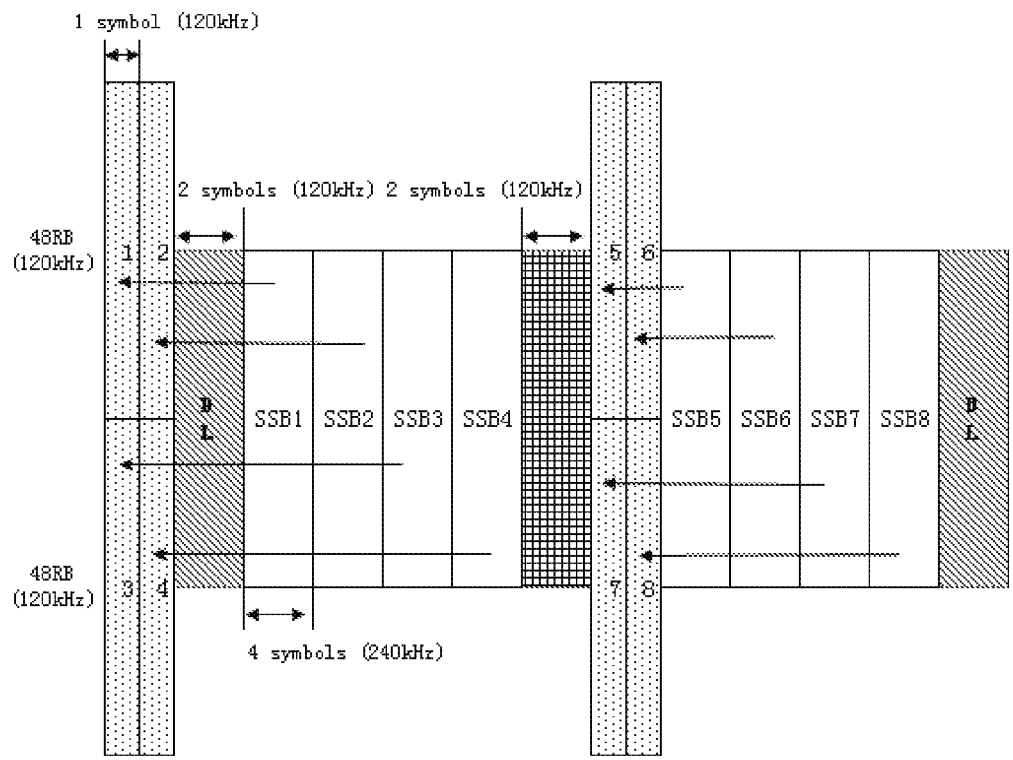
Figure 15C:
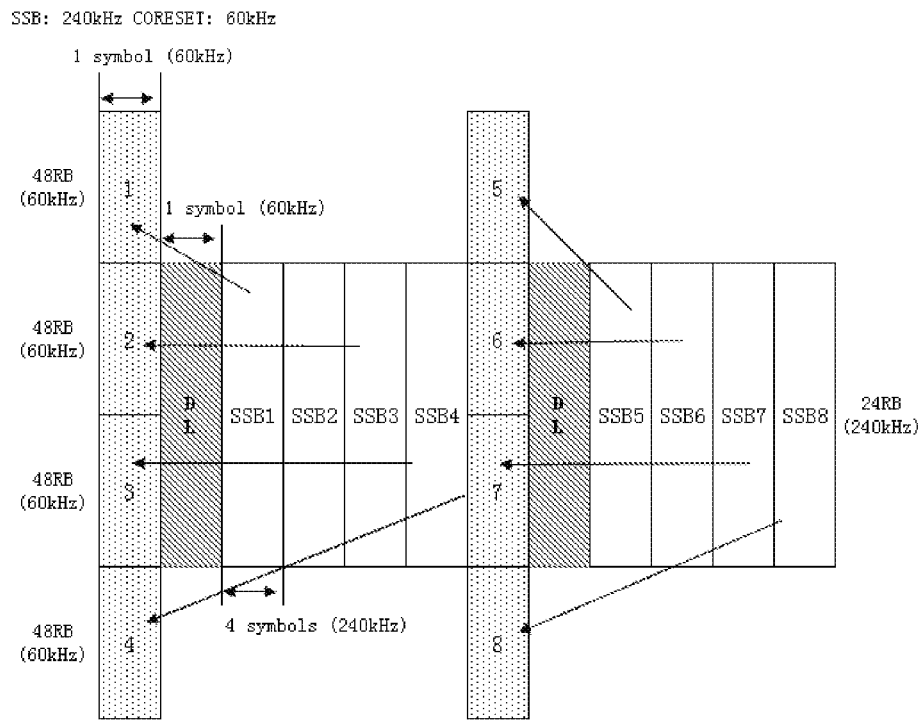
Figure 16A:
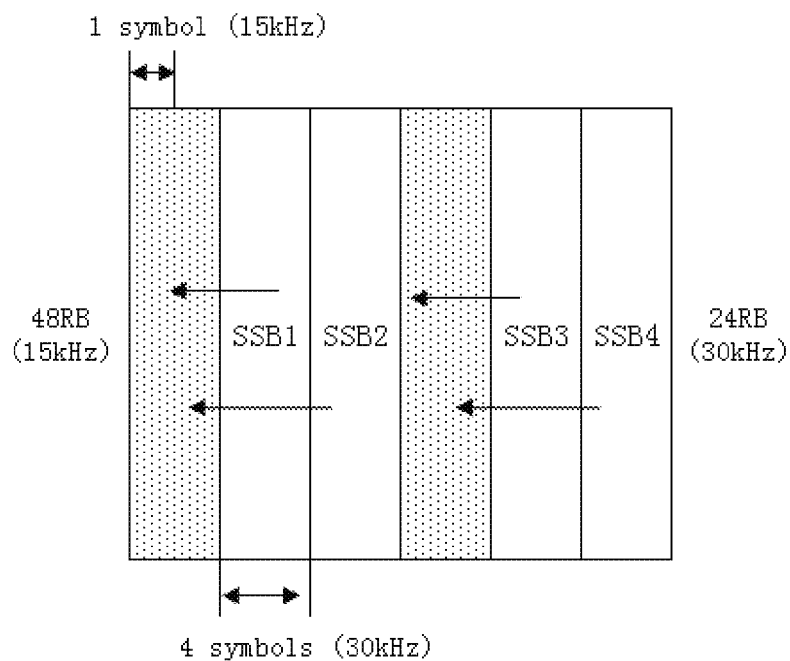
FIG. 16a to FIG. 16c are respectively schematic diagrams of time-frequency domain resources of a CORESET and a SS block in a thirteenth scenario.
Figure 16B:
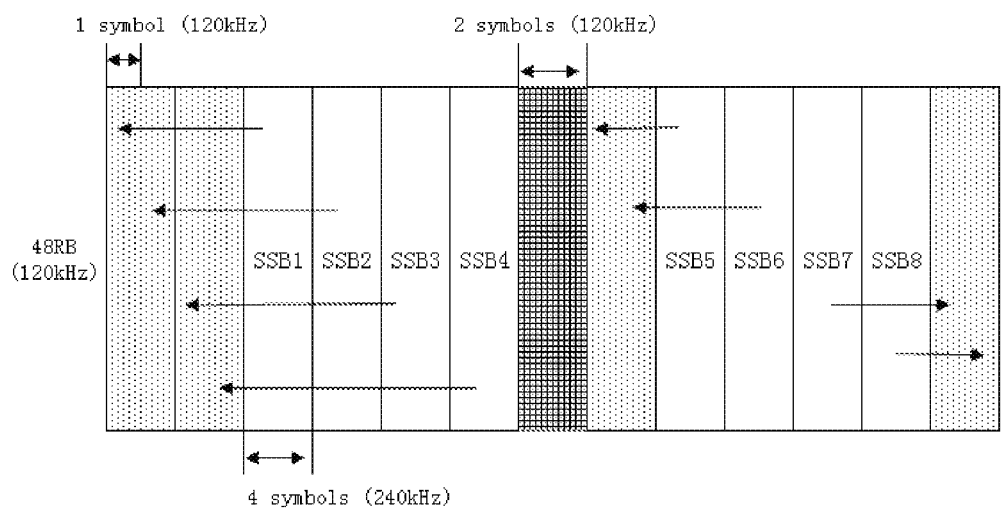
Figure 16C:
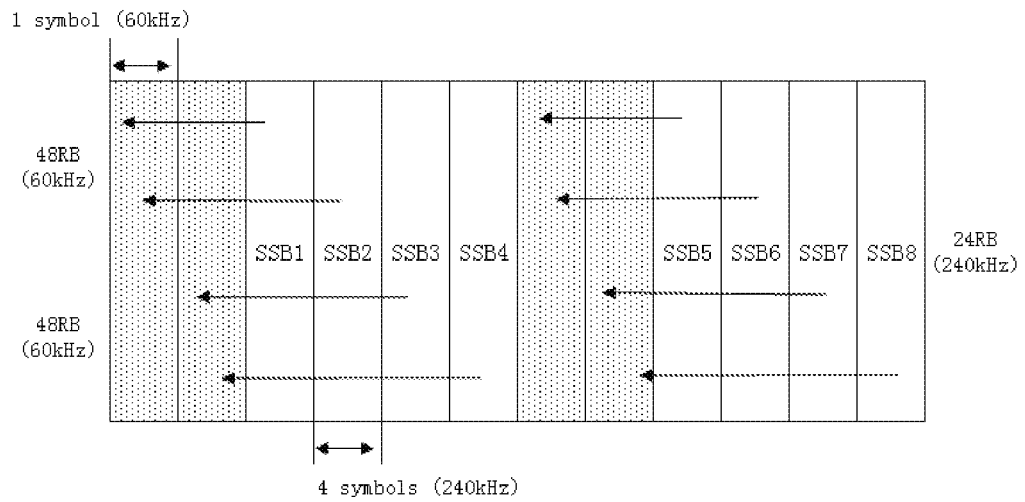
Figure 17A:
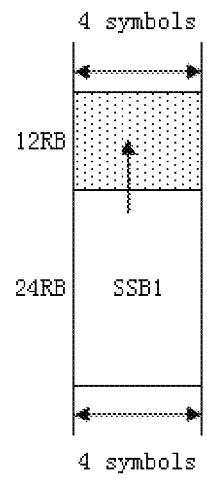
FIG. 17a to FIG. 17d are respectively schematic diagrams of time-frequency domain resources of a CORESET and a SS block in a fourteenth scenario.
Figure 17B:
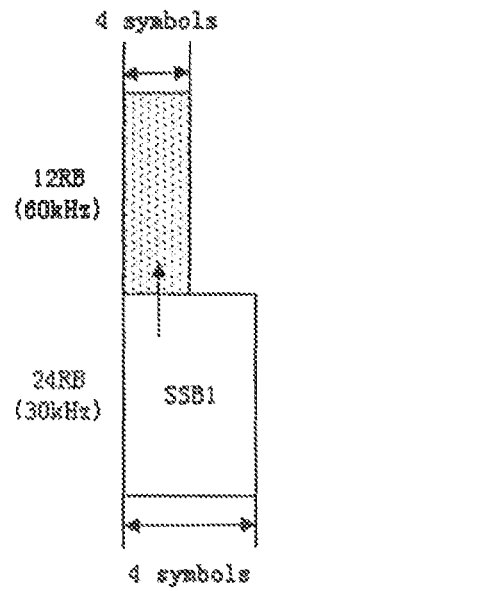
Figure 17C:
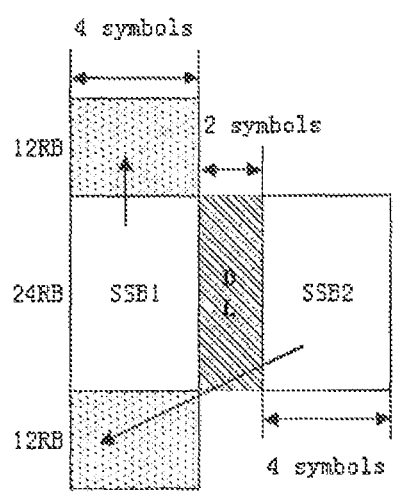
Figure 17D:
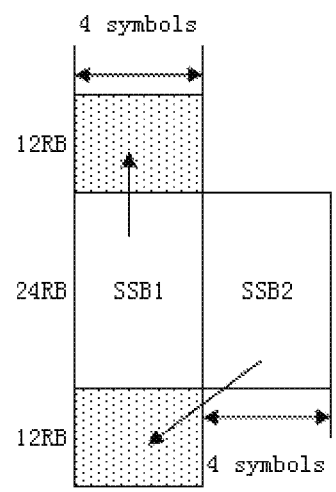

| Second indication field (3 bits) | Multiplexing pattern | Application scenario |
| --- | --- | --- |
| Fourth value, e.g., 011 | TDM | subcarrier spacing for SS block is: 30 kHz (pattern1), subcarrier spacing for CORESET is: 15 kHz subcarrier spacing for SS block is: 120 kHz, subcarrier spacing for CORESET is: 60 kHz, as shown in FIG. 14a subcarrier spacing for SS block is: 240 kHz, subcarrier spacing for CORESET is: 120 kHz, as shown in FIG. 14b subcarrier spacing for SS block is: 240 kHz, subcarrier spacing for CORESET is: 60 kHz, as shown in FIG. 14c |
| Fifth value, e.g., 100 | TDM | subcarrier spacing for SS block is: 30 kHz (pattern1), subcarrier spacing for CORESET is: 15 kHz subcarrier spacing for SS block is: 120 kHz, subcarrier spacing for CORESET is: 60 kHz, as shown in FIG. 15a subcarrier spacing for SS block is: 240 kHz, subcarrier spacing for CORESET is: 120 kHz, as shown in FIG. 15b subcarrier spacing for SS block is: 240 kHz, subcarrier spacing for CORESET is: 60 kHz, as shown in FIG. 15c |
| Sixth value, e.g., 101 | TDM | subcarrier spacing for SS block is: 30 kHz (pattern1), subcarrier spacing for CORESET is: 15 kHz subcarrier spacing for SS block is: 120 kHz, subcarrier spacing for CORESET is: 60 kHz, as shown in FIG. 16a subcarrier spacing for SS block is: 240 kHz, subcarrier spacing for CORESET is: 120 kHz, as shown in FIG. 16b subcarrier spacing for SS block is: 240 kHz, subcarrier spacing for CORESET is: 60 kHz, as shown in FIG. 16c |
| Seventh value, e.g., 110 | | reserved |
| Eighth value, e.g., 111 | | reserved |

For example, assuming that numerology for SS block is the same as numerology for CORESET (denoted as type1), there are 7 different CORESET schemes; assuming that numerology for SS block is different from numerology for CORESET (denoted as type2), there are 6 different CORESET schemes, thus there are 13 schemes in total. Here, if configurations of the 13 CORESET schemes are directly indicated in the MIB, 4 bits are required. Therefore, it is considered to use DL numerology information to jointly configure the CORESET schemes. Through selecting configurations for type1 or type2 by using DL numerology information, overhead for configuring CORESET schemes is reduced to 3 bits of MIB. The terminal performs a blind detection of SS block on carriers to determine numerology for SS block, e.g., 120 kHz. The UE decodes MIB information carried in the SS block to obtain the DL numerology information, and the RMSI CORESET scheme configuration information, e.g., 000. The DL numerology information indicates that numerologies for the SS block and CORESET are different, i.e., the numerology for CORESET is 60 kHz. The terminal determines that CORESET scheme employed by the base station is one of the 6 possible CORESET schemes for type2. Since at this time the DL numerology information may indicate the subcarrier spacing for CORESET, according to the correspondence between the subcarrier spacing for SS block and the subcarrier spacing for CORESET in the application scenario column of the above table, it may be directly determined that the CORESET scheme is a specific configuration of certain scheme for type2. In this way, a specific configuration of a specific scheme for type2 may be determined according to DL numerology information and RMSI CORESET configuration information, and the terminal searches for CORESET according to time-frequency positions of the specific configuration.

Alternatively, assuming that numerology for SS block is the same as numerology for CORESET (denoted as type1), there are 7 different CORESET schemes; assuming that numerology for SS block is different from numerology for CORESET (denoted as type2), there are 6 different CORESET schemes, thus there are 13 schemes in total. Here, if configurations of the 13 CORESET schemes are directly indicated in the MIB, 4 bits are required. Therefore, it is considered to use DL numerology information to jointly configure the CORESET schemes, and the RMSI CORESET numerology may be determined from the DL numerology information. Assuming SS block numerology is 240 kHz, a DL numerology information being 1 represents the RMSI CORESET has a numerology of 120 kHz and a DL numerology information being 0 represents the RMSI CORESET has a numerology of 60 kHz. UE selects configurations for type1 or type2 with the aid of DL numerology information, thereby overhead for configuring CORESET schemes is reduced to 3 bits of MIB. The terminal performs a blind detection of SS block on carriers to determine numerology for SS block, e.g., 240 kHz. The terminal decodes MIB information carried in the SS block to obtain the DL numerology information, and the RMSI CORESET scheme configuration information, e.g., 000; and the DL numerology information is 1, i.e., the numerology for CORESET is 120 kHz. The terminal determines that CORESET scheme is the first one of the 6 possible CORESET schemes for type2. Alternatively, in using DL numerology information to jointly configure the CORESET schemes, one bit of the DL numerology information is used to indicate numerology information for RMSI CORESET and the DL numerology information includes second indication information. For example, when subcarrier spacing (SCS) for SS block is 240 kHz, a DL numerology information being 0 indicates that RMSI CORESET SCS is 60 kHz, while a DL numerology information being 1 indicates that RMSI CORESET SCS is 120 kHz. The terminal decodes the SS block to determine that the SCS for the SS block is 240 kHz and obtain the DL numerology information. When the DL numerology information is 0, it is indicated that the SCS for the RMSI CORESET is 60 kHz.

Further, as shown in FIG. 17a to FIG. 19d, in addition to the indication information for indicating the CORESET configuration codebook, the second indication field includes at least one of: third indication information, for indicating a transmission mode of the SS block; fourth indication information, for indicating that the CORESET occupies four OFDM symbols of a time domain resource; or fifth indication information, for indicating that at least a part of the CORESET occupies an idle resource block of the SS block.

As shown in FIG. 7a to FIG. 17d, DL numerology information is used to jointly configure CORESET schemes, and bits are reserved in the CORESET scheme configuration information as the fourth indication information, for example, 111, for indicating that the RMSI CORESET lasts four OFDM symbols in the time domain and is frequency division multiplexed with the SS block.

Figure 18A:
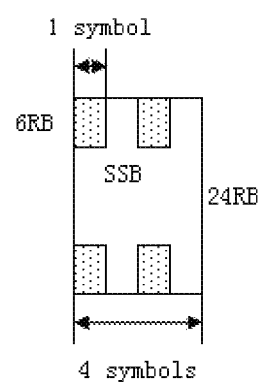
FIG. 18a to FIG. 18b are respectively schematic diagrams of time-frequency domain resources of a CORESET and a SS block in a fifteenth scenario.
Figure 18B:
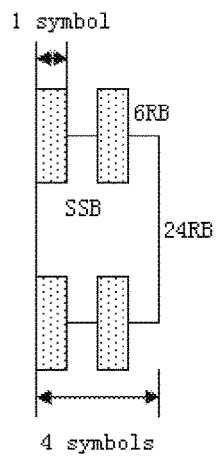
Figure 19A:
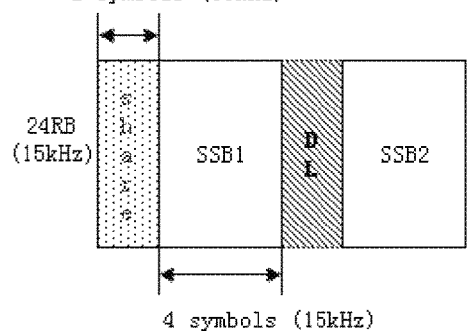
FIG. 19a to FIG. 19d are respectively schematic diagrams of time-frequency domain resources of a CORESET and a SS block in a sixteenth scenario.
Figure 19B:
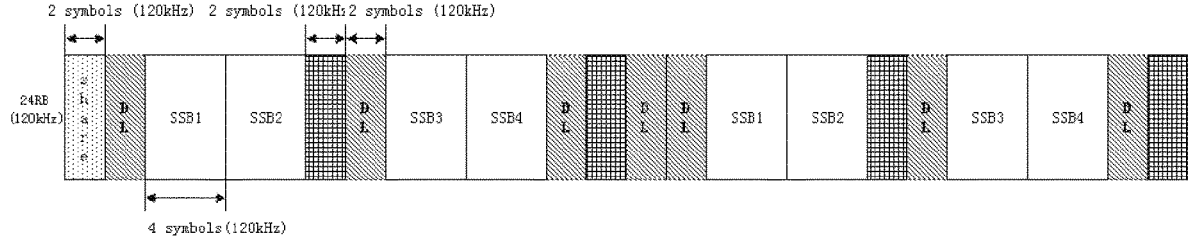
Figure 19C:
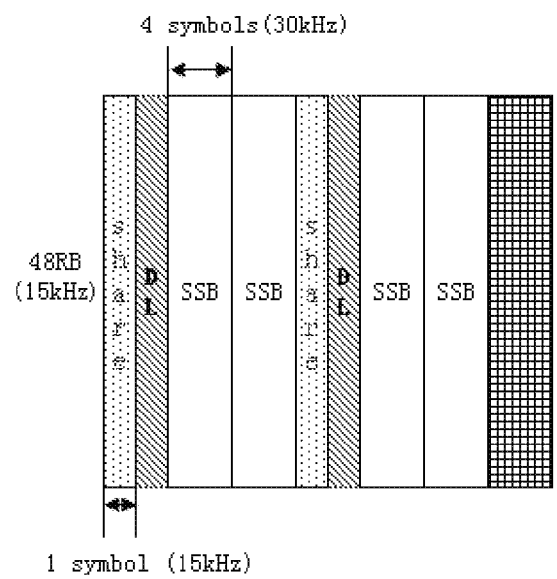
Figure 19D:
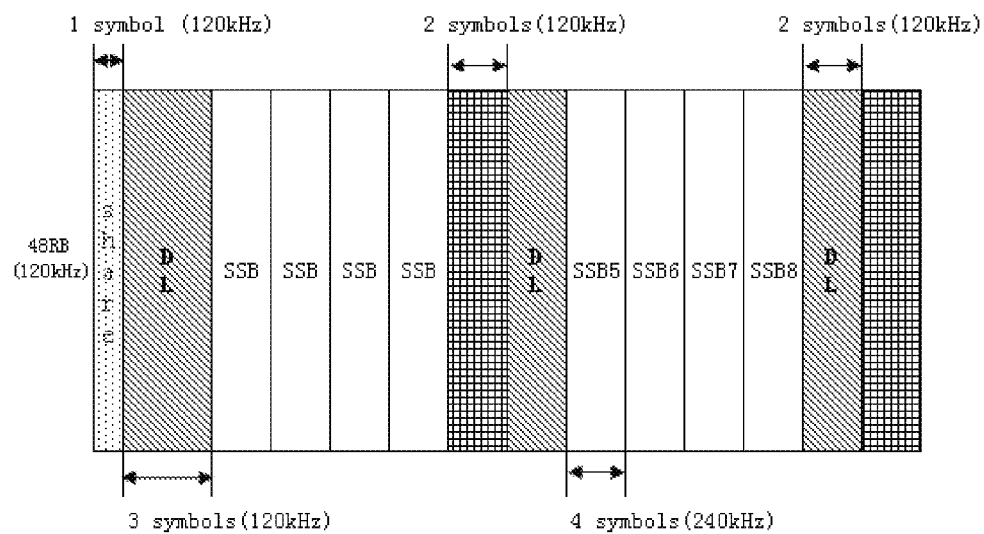

As shown in FIG. 18a to FIG. 18b, DL numerology information is used to jointly configure CORESET schemes, and bits are reserved in the CORESET scheme configuration information as the fifth indication information, for example, 111, for indicating that the CORESET may use an idle resource block of the SS block.

As shown in FIG. 19a to FIG. 19d, DL numerology information is used to jointly configure CORESET schemes, and bits are reserved in the CORESET scheme configuration information as the third indication information, for example, 111, for indicating that multiple SS blocks share one CORESET, and by default, these SS blocks are transmitted repeatedly. The shared CORESET may occupy one or more symbols in the time domain, and may have multiple possible time domain positions. The terminal performs a blind detection of SS block on carriers to determine numerology for SS block. The terminal decodes MIB information carried in the SS block to obtain the DL numerology information, and the RMSI CORESET scheme configuration information, e.g., 111. The DL numerology information indicates that numerologies for the SS block and CORESET are the same or different. As a result, UE determines that CORESET scheme is the reserved eighth scheme for type1 or type2 and recognizes that SS blocks configured by using this CORESET scheme are transmitted repeatedly. For example, for a high frequency band above 6 GHz, a series of 8 SS blocks are transmitted repeatedly; for a low frequency band below 6 GHz, a series of 2 SS blocks are transmitted repeatedly.

According to the method of configuring a CORESET provided by the embodiment of the present disclosure, the network equipment transmits to the terminal a first indication field for indicating downlink numerology information and a second indication field for indicating a CORESET configuration codebook. By indicating the time-frequency positions of the CORESET of data information jointly with the first indication field and the second indication field, the bit overhead of the system MIB may be reduced, thereby improving resource utilization.

The foregoing examples describe in detail the method of configuring the CORESET in different scenarios respectively. The following example further describes corresponding network equipment with reference to accompanying drawing hereinafter.

Figure 20:
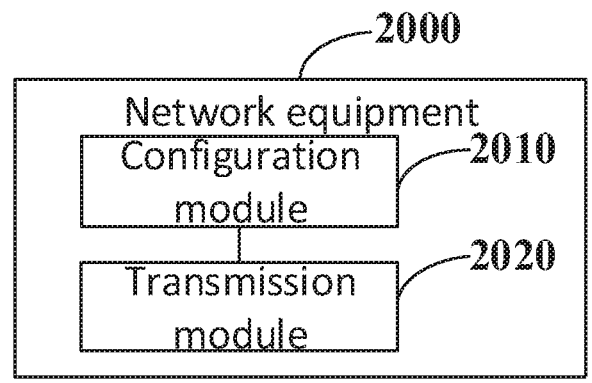
FIG. 20 is a schematic module diagram of a network equipment according to an embodiment of the present disclosure.

As shown in FIG. 20, network equipment 2000 provided by an embodiment of the present disclosure may implement the detail of the method of configuring, for a terminal, indication information for indicating time-frequency domain position information of the CORESET of data information and transmitting the indication information to the terminal in the foregoing embodiment, and achieve the same or similar effect. The indication information includes: a first indication field for indicating downlink numerology information and a second indication field for indicating a CORESET configuration codebook. The network equipment 2000 includes specifically following functional modules: a configuration module 2010, configured to configure, for a terminal, indication information for indicating time-frequency domain position information of a control resource set (CORESET) for data information; where the indication information includes: a first indication field for indicating downlink numerology information and a second indication field for indicating a CORESET configuration codebook; and a transmission module 2020, configured to transmit the indication information to the terminal.

The first indication field includes at least one of: first indication information for indicating whether numerology information for the CORESET is the same as numerology information for the SS block; or second indication information for indicating the numerology information for the CORESET.

When the numerology information for the SS block is first numerology information, if the second indication information is a first value, the second indication information indicates that the numerology information for the CORESET is second numerology information corresponding to the first numerology information.

The CORESET configuration codebook includes at least one of following information: a time domain position of the CORESET, a time domain duration of the CORESET, a frequency domain position of the CORESET, a frequency domain width of the CORESET, an aggregation level (AL) of the CORESET, a distribution mode of the CORESET or a multiplexing pattern of the CORESET and the SS block.

The CORESET configuration codebook includes: a first configuration codebook in which numerology information for the CORESET is the same as numerology information for a synchronized signal block (SS block), or a second configuration codebook in which the numerology information for the CORESET is different from the numerology information for the SS block.

The second indication field indicates, when the second indication field denotes a first value of the first configuration codebook, that the CORESET is frequency division multiplexed with the SS block and the CORESET occupies two first time domain symbols of a transmission resource of the SS block.

The second indication field indicates, when the second indication field denotes a second value of the first configuration codebook, that the CORESET is frequency division multiplexed with the SS block and the CORESET occupies three first time domain symbols of the transmission resource of the SS block.

The second indication field indicates, when the second indication field denotes a third value of the first configuration codebook, that the CORESET is frequency division multiplexed with the SS block and the CORESET occupies one first time domain symbol of the transmission resource of the SS block.

The second indication field indicates, when the second indication field denotes a fourth value of the first configuration codebook, that the CORESET is time division multiplexed with the SS block, and the CORESET overlaps with a frequency domain resource of the SS block and occupies two first other time domain symbols of a slot where the SS block is located.

The second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located.

The second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located.

The second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located.

The first time domain symbol is a candidate time domain symbol used to transmit the SS block, and the first other time domain symbol is an time domain symbol, other than a candidate transmission position of the SS block, an Uplink (UL) control and a guard period, of the slot where the SS block is located.

The second indication field indicates, when the second indication field denotes a first value of the second configuration codebook, that the CORESET is frequency division multiplexed with the SS block and the CORESET occupies one second time domain symbol within a range of first time domain symbols where the SS block is located.

The second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located.

The second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located.

The second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located.

The second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located.

The second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located.

The first time domain symbol is a candidate time domain symbol used to transmit the SS block, the second time domain symbol is a candidate time domain symbol used to transmit the CORESET, and the second other time domain symbol is an time domain symbol, other than a candidate transmission position of the SS block, an Uplink (UL) control and a guard period, of the slot where the CORESET is located.

In addition to indication information for indicating the CORESET configuration codebook, the second indication field includes at least one of: third indication information, for indicating a transmission mode of the SS block; fourth indication information, for indicating that the CORESET occupies four OFDM symbols of a time domain resource; or fifth indication information, for indicating that at least a part of the CORESET occupies an idle resource block of the SS block.

The indication information is carried in a system master information block (MIB), and the transmission module includes: a transmission unit, configured to transmit a synchronized signal block (SS block) carrying the system MIB to the terminal.

It is noted, the network equipment according to the embodiment of the present disclosure transmits to the terminal a first indication field for indicating downlink numerology information and a second indication field for indicating a CORESET configuration codebook. By indicating the time-frequency positions of the CORESET of data information jointly with the first indication field and the second indication field, the bit overhead of the system MIB may be reduced, thereby improving resource utilization.

To better achieve the aforementioned objective, an embodiment of the present disclosure further provides a network equipment. The network equipment includes: a processor, a memory and a computer program stored in the memory and configured to be executed by the processor, where the processor is configured to execute the computer program, to implement steps of the foregoing method. An embodiment of the present disclosure further provides a computer readable storage medium storing therein a computer program, where the computer program is configured to be executed by a processor, to implement steps of the foregoing methods.

Figure 21:
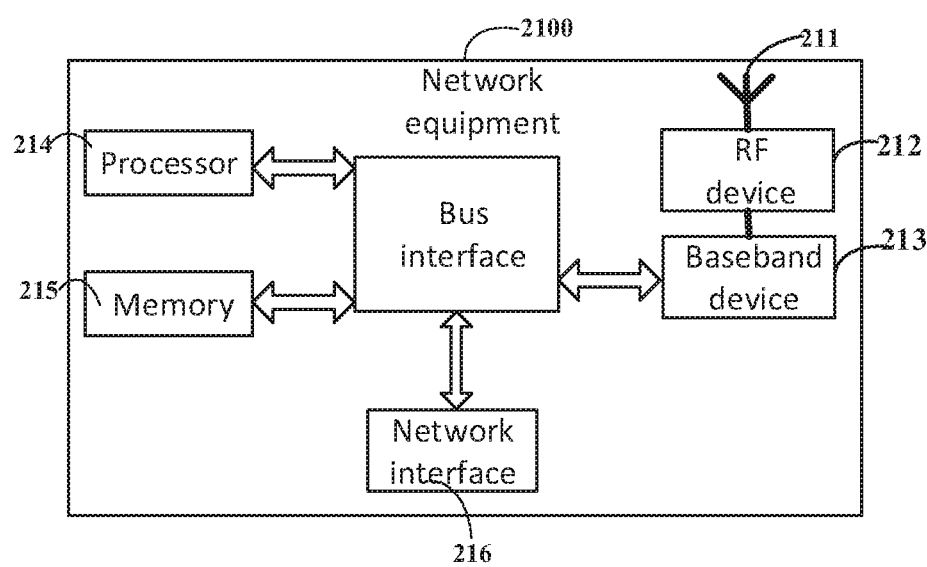
FIG. 21 is a block diagram of a network equipment according to an embodiment of the present disclosure.

In specific, an embodiment of the present disclosure further provides network equipment. As shown in FIG. 21, the network equipment 2100 includes: an antenna 211, a radio frequency (RF) device 212, and a baseband device 213. The antenna 211 is connected to the RF device 212. In an uplink direction, the RF device 212 receives information through the antenna 211, and transmits the received information to the baseband device 213 for processing. In a downlink direction, the baseband device 213 processes information to be transmitted, and transmits the information to the RF device 212. The RF device 212 processes the received information and transmits the processed information via the antenna 211.

The foregoing frequency band processing device may be located in the baseband device 213. The method performed by the network equipment in the foregoing embodiments may be implemented in the baseband device 213. The baseband device 213 includes a processor 214 and a memory 215.

The baseband device 213 may include, for example, at least one baseband processing board. A plurality of chips are disposed on the baseband processing board. As shown in FIG. 21, one of the chips is, for example, the processor 214, and the processor 214 is connected to the memory 215, to call a program in the memory 215, to perform the operations of the network equipment as described in the foregoing method embodiments.

The baseband device 213 may further include a network interface 216, configured to exchange information with the RF device 212. The interface is, for example, a common public radio interface (CPRI).

The processor herein may be one processor or refer to multiple processing elements collectively. For example, the processor may be a central processing unit (CPU), or may be an application specific integrated circuit (ASIC), or one or more integrated circuits (ICs) configured to implement the method performed by the network equipment, such as one or more digital signal processors (DSPs), or one or more field programmable gate arrays (FPGAs). The storage element may be one memory or may refer to multiple storage elements collectively.

The memory 215 may be a volatile memory or a non-volatile memory or may include both a volatile memory and a non-volatile memory. The non-volatile memory may be a read-only memory (ROM), a programmable ROM (PROM), an erasable PROM (EPROM), an electrically EPROM (EEPROM) or a flash memory. The volatile memory may be a random access memory (RAM) and is used as an external cache. By way of example and without any limitation, various forms of RAMs are usable, such as a static RAM (SRAM), a dynamic RAM (DRAM), a synchronous DRAM (SDRAM), a double data rate SDRAM (DDRSDRAM), an enhanced SDRAM (ESDRAM), an synch link DRAM (SLDRAM), and a direct Rambus RAM (DRRAM). The memory 215 described in this application is intended to include, without limitation, these and any other suitable types of memories.

Specifically, the network equipment according to the embodiment of the present disclosure further includes: a computer program stored in the memory 215 and configured to be executed by the processor 214. The processor 214 is configured to call the computer program in the memory 215 to implement the method performed by various modules as shown in FIG. 20.

Specifically, the processor 214 is configured to call the computer program to implement following steps: configuring, for a terminal, indication information for indicating time-frequency domain position information of the CORESET of data information; where the indication information includes: a first indication field for indicating downlink numerology information and a second indication field for indicating a CORESET configuration codebook; and transmitting the indication information to the terminal.

The first indication field includes at least one of: first indication information for indicating whether numerology information for the CORESET is the same as numerology information for the SS block; or second indication information for indicating the numerology information for the CORESET.

When the numerology information for the SS block is first numerology information, if the second indication information is a first value, the second indication information indicates that the numerology information for the CORESET is second numerology information corresponding to the first numerology information.

The CORESET configuration codebook includes at least one of following information: a time domain position of the CORESET, a time domain duration of the CORESET, a frequency domain position of the CORESET, a frequency domain width of the CORESET, an aggregation level (AL) of the CORESET, a distribution mode of the CORESET or a multiplexing pattern of the CORESET and the SS block.

The CORESET configuration codebook includes: a first configuration codebook in which numerology information for the CORESET is the same as numerology information for a synchronized signal block (SS block), or a second configuration codebook in which the numerology information for the CORESET is different from the numerology information for the SS block.

The second indication field indicates, when the second indication field denotes a first value of the first configuration codebook, that the CORESET is frequency division multiplexed with the SS block and the CORESET occupies two first time domain symbols of a transmission resource of the SS block.

The second indication field indicates, when the second indication field denotes a second value of the first configuration codebook, that the CORESET is frequency division multiplexed with the SS block and the CORESET occupies three first time domain symbols of the transmission resource of the SS block.

The second indication field indicates, when the second indication field denotes a third value of the first configuration codebook, that the CORESET is frequency division multiplexed with the SS block and the CORESET occupies one first time domain symbol of the transmission resource of the SS block.

The second indication field indicates, when the second indication field denotes a fourth value of the first configuration codebook, that the CORESET is time division multiplexed with the SS block, and the CORESET overlaps with a frequency domain resource of the SS block and occupies two first other time domain symbols of a slot where the SS block is located.

The second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located.

The second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located.

The second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located.

The first time domain symbol is a candidate time domain symbol used to transmit the SS block, and the first other time domain symbol is an time domain symbol, other than a candidate transmission position of the SS block, an Uplink (UL) control and a guard period, of the slot where the SS block is located.

The second indication field indicates, when the second indication field denotes a first value of the second configuration codebook, that the CORESET is frequency division multiplexed with the SS block and the CORESET occupies one second time domain symbol within a range of first time domain symbols where the SS block is located.

The second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located.

The second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located.

The second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located.

The second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located.

The second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located.

The first time domain symbol is a candidate time domain symbol used to transmit the SS block, the second time domain symbol is a candidate time domain symbol used to transmit the CORESET, and the second other time domain symbol is an time domain symbol, other than a candidate transmission position of the SS block, an Uplink (UL) control and a guard period, of the slot where the CORESET is located.

In addition to indication information for indicating the CORESET configuration codebook, the second indication field includes at least one of: third indication information, for indicating a transmission mode of the SS block; fourth indication information, for indicating that the CORESET occupies four time domain symbols of a time domain resource; or fifth indication information, for indicating that at least a part of the CORESET occupies an idle resource block of the SS block.

The indication information is carried in a system master information block (MIB), and the processor 44 is configured to call the computer program to implement following step: transmitting a synchronized signal block (SS block) carrying the system MIB to the terminal.

The network equipment may be a base transceiver station (BTS) in the global system of mobile communication (GSM) or the code division multiple access (CDMA), a NodeB (NB) in the wideband code division multiple access (WCDMA), an evolutional Node B (eNB or eNodeB) in LTE, a relay station or an access point, or a gNodeB (gNB) in future 5G network, or the like, which is not limited herein.

The network equipment according to the embodiment of the present disclosure transmits to the terminal a first indication field for indicating downlink numerology information and a second indication field for indicating a CORESET configuration codebook. By indicating the time-frequency positions of the CORESET of data information jointly with the first indication field and the second indication field, the bit overhead of the system MIB may be reduced, thereby improving resource utilization.

The foregoing examples describe, from the perspective of a network equipment side, the method of configuring the CORESET provided by the present disclosure respectively. The following example further describes, with reference to accompanying drawing, a method of configuring the CORESET applied to a terminal side.

Figure 22:
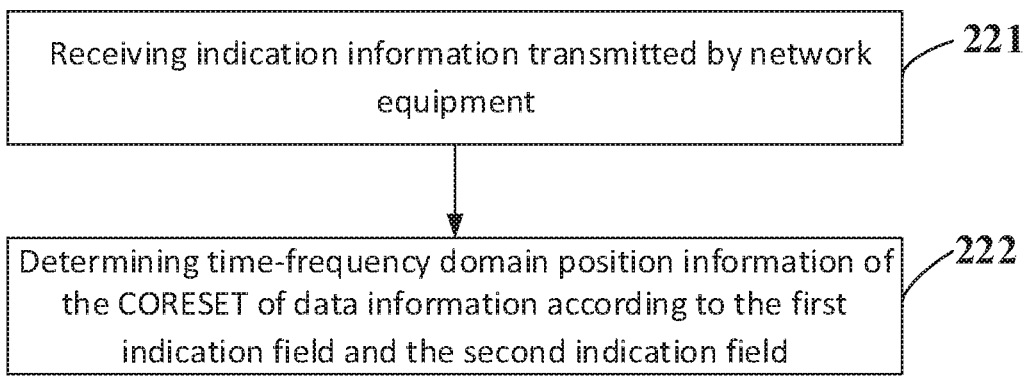
FIG. 22 is a schematic flow diagram of a method of configuring a CORESET applied to a terminal side according to an embodiment of the present disclosure.

As shown in FIG. 22, the method of configuring the CORESET applied to a terminal side provided by an embodiment of the present disclosure includes specifically: step 221: receiving indication information transmitted by network equipment; where the indication information includes: a first indication field for indicating downlink numerology information and a second indication field for indicating a CORESET configuration codebook; and step 222: determining time-frequency domain position information of the CORESET of data information according to the first indication field and the second indication field.

The first indication field includes at least one of: first indication information for indicating whether numerology information for the CORESET is the same as numerology information for the SS block; or second indication information for indicating the numerology information for the CORESET.

When the numerology information for the SS block is first numerology information, if the second indication information is a first value, the second indication information indicates that the numerology information for the CORESET is second numerology information corresponding to the first numerology information.

The CORESET configuration codebook includes at least one of following information: a time domain position of the CORESET, a time domain duration of the CORESET, a frequency domain position of the CORESET, a frequency domain width of the CORESET, an aggregation level (AL) of the CORESET, a distribution mode of the CORESET or a multiplexing pattern of the CORESET and the SS block.

The CORESET configuration codebook includes: a first configuration codebook in which numerology information for the CORESET is the same as numerology information for a synchronized signal block (SS block), or a second configuration codebook in which the numerology information for the CORESET is different from the numerology information for the SS block.

The second indication field indicates, when the second indication field denotes a first value of the first configuration codebook, that the CORESET is frequency division multiplexed with the SS block and the CORESET occupies two first time domain symbols of a transmission resource of the SS block.

The second indication field indicates, when the second indication field denotes a second value of the first configuration codebook, that the CORESET is frequency division multiplexed with the SS block and the CORESET occupies three first time domain symbols of the transmission resource of the SS block.

The second indication field indicates, when the second indication field denotes a third value of the first configuration codebook, that the CORESET is frequency division multiplexed with the SS block and the CORESET occupies one first time domain symbol of the transmission resource of the SS block.

The second indication field indicates, when the second indication field denotes a fourth value of the first configuration codebook, that the CORESET is time division multiplexed with the SS block, and the CORESET occupies two first other time domain symbols, overlapping with a frequency domain resource of the SS block, of a slot where the SS block is located.

The second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located.

The second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located.

The second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located.

The first time domain symbol is a candidate time domain symbol used to receive the SS block, and the first other time domain symbol is a time domain symbol, other than a candidate transmission position of the SS block, an Uplink (UL) control and a guard period, of the slot where the SS block is located.

The second indication field indicates, when the second indication field denotes a first value of the second configuration codebook, that the CORESET is frequency division multiplexed with the SS block and the CORESET occupies one second time domain symbol within a range of first time domain symbols where the SS block is located.

The second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located.

The second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located.

The second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located.

The second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located.

The second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located.

The first time domain symbol is a candidate time domain symbol used to receive the SS block, the second time domain symbol is a candidate time domain symbol used to receive the CORESET, and the second other time domain symbol is an time domain symbol, other than a candidate transmission position of the SS block, an Uplink (UL) control and a guard period, of the slot where the CORESET is located.

In addition to indication information for indicating the CORESET configuration codebook, the second indication field includes at least one of: third indication information, for indicating a transmission mode of the SS block; fourth indication information, for indicating that the CORESET occupies four time domain symbols of a time domain resource; or fifth indication information, for indicating that at least a part of the CORESET occupies an idle resource block of the SS block.

The step of receiving indication information transmitted by network equipment includes: receiving a synchronized signal block (SS block) transmitted by the network equipment; determining a system master information block (MIB) according to the SS block; and determining the indication information according to the system MIB.

After the receiving the indication information transmitted by the network equipment, the method further includes: performing a blind detection of the CORESET according to the indication information when the time-frequency domain position information of the CORESET of the data information is not determined according to the indication information. The time-frequency domain position information of the CORESET is determined according to numerology information for the CORESET.

Assuming that numerology for SS block is the same as numerology for CORESET (denoted as type1), there are 7 different CORESET schemes; assuming that numerology for SS block is different from numerology for CORESET (denoted as type2), there are 6 different CORESET schemes, thus there are 13 schemes in total. Here, if configurations of the 13 CORESET schemes are directly indicated in the MIB, 4 bits are required. Therefore, it is considered to use DL numerology information to jointly configure the CORESET schemes. In case that the RMSI CORESET numerology cannot be determined from the DL numerology information and assuming SS block numerology is 240 kHz, a DL numerology information being 0 represents the SS block and the CORESET have different numerologies, and a DL numerology information being 1 represents the SS block and the CORESET have a same numerology. UE selects configurations for type1 or type2 with the aid of DL numerology information, thereby overhead for configuring CORESET schemes is reduced to 3 bits of MIB. The terminal performs a blind detection of SS block on carriers to determine numerology for SS block, e.g., 240 kHz. The terminal decodes MIB information carried in the SS block to obtain the DL numerology information, and the RMSI CORESET scheme configuration information, e.g., 000; and the DL numerology information indicates that the SS block and the CORESET have different numerologies, i.e., numerology for the CORESET is 120 kHz or 60 kHz. The UE determines that the CORESET scheme is the first scheme of the 5 possible CORESET schemes for type2, then the UE needs to perform a further blind detection. The terminal performs a blind detection of the CORESET according to possible time-frequency positions provided by the first scheme, to determine actual numerology for the CORESET, thereby determining a CORESET scheme employed by the base station.

Further, DL numerology information is used to jointly configure CORESET schemes, and one bit of the DL numerology information is used to indicate numerology information for RMSI CORESET. For example, when the DL numerology information is 0, it is indicated that numerologies for the RMSI CORESET and the SS block are not consistent; when the DL numerology information is 1, it is indicated that numerologies for the RMSI CORESET and the SS block are consistent. Assuming that SCS for an SS block is 30 kHz, and SCS for an RMSI CORESET is 15 kHz. The terminal acquires, from the SS block, DL numerology information of 0, which indicates that numerologies for the RMSI CORESET and the SS block are not consistent. Since SCS for the RMSI CORESET may be 15 kHz or 60 kHz when SCS for the SS block is 30 kHz and if numerologies for the RMSI CORESET and the SS block are not consistent, UE then needs to perform a further blind detection of RMSI CORESET to determine whether SCS for the RMSI CORESET is 15 kHz or 60 kHz.

According to the method of configuring a CORESET provided by the embodiment of the present disclosure, the terminal receives a first indication field for indicating downlink numerology information and a second indication field for indicating a CORESET configuration codebook transmitted by the network equipment. By indicating the time-frequency positions of the CORESET of data information jointly with the first indication field and the second indication field, the bit overhead of the system MIB may be reduced, thereby improving resource utilization.

The foregoing examples describe the method of configuring the CORESET in different scenarios. A corresponding terminal is further described with reference to accompanying drawing hereinafter.

Figure 23:
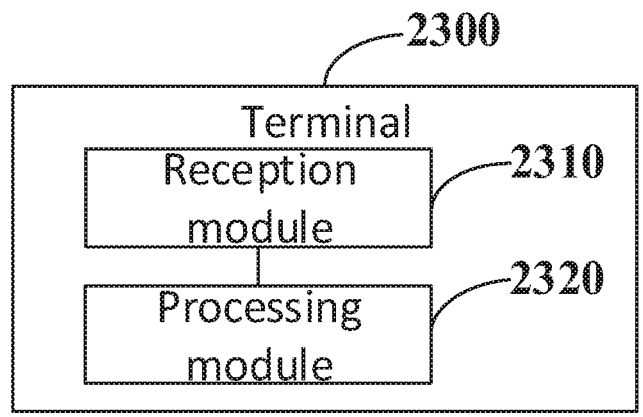
FIG. 23 is a schematic module diagram of a terminal according to an embodiment of the present disclosure.

As shown in FIG. 23, a terminal 2300 provided by an embodiment of the present disclosure may implement the detail of the method of receiving indication information transmitted by network equipment, and determining time-frequency domain position information of the CORESET of data information according to the first indication field and the second indication field in the foregoing embodiment, and achieve the same or similar effect. The indication information includes: a first indication field for indicating downlink numerology information and a second indication field for indicating a CORESET configuration codebook. The terminal 2300 includes specifically following functional modules:

a reception module 2310, configured to receive indication information transmitted by a network equipment; where the indication information includes: a first indication field for indicating downlink numerology information and a second indication field for indicating a control resource set (CORESET) configuration codebook; and a processing module 2320, configured to determine time-frequency domain position information of the CORESET of data information according to the first indication field and the second indication field.

The first indication field includes at least one of: first indication information for indicating whether numerology information for the CORESET is the same as numerology information for the SS block; or second indication information for indicating the numerology information for the CORESET.

When the numerology information for the SS block is first numerology information, if the second indication information is a first value, the second indication information indicates that the numerology information for the CORESET is second numerology information corresponding to the first numerology information.

The CORESET configuration codebook includes at least one of following information: a time domain position of the CORESET, a time domain duration of the CORESET, a frequency domain position of the CORESET, a frequency domain width of the CORESET, an aggregation level (AL) of the CORESET, a distribution mode of the CORESET or a multiplexing pattern of the CORESET and the SS block.

The CORESET configuration codebook includes: a first configuration codebook in which numerology information for the CORESET is the same as numerology information for a synchronized signal block (SS block), or a second configuration codebook in which the numerology information for the CORESET is different from the numerology information for the SS block.

The second indication field indicates, when the second indication field denotes a first value of the first configuration codebook, that the CORESET is frequency division multiplexed with the SS block and the CORESET occupies two first time domain symbols of a transmission resource of the SS block.

The second indication field indicates, when the second indication field denotes a second value of the first configuration codebook, that the CORESET is frequency division multiplexed with the SS block and the CORESET occupies three first time domain symbols of the transmission resource of the SS block.

The second indication field indicates, when the second indication field denotes a third value of the first configuration codebook, that the CORESET is frequency division multiplexed with the SS block and the CORESET occupies one first time domain symbol of the transmission resource of the SS block.

The second indication field indicates, when the second indication field denotes a fourth value of the first configuration codebook, that the CORESET is time division multiplexed with the SS block, and the CORESET occupies two first other time domain symbols, overlapping with a frequency domain resource of the SS block, of a slot where the SS block is located.

The second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located.

The second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located.

The second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located.

The first time domain symbol is a candidate time domain symbol used to receive the SS block, and the first other time domain symbol is a time domain symbol, other than a candidate transmission position of the SS block, an Uplink (UL) control and a guard period, of the slot where the SS block is located.

The second indication field indicates, when the second indication field denotes a first value of the second configuration codebook, that the CORESET is frequency division multiplexed with the SS block and the CORESET occupies one second time domain symbol within a range of first time domain symbols where the SS block is located.

The second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located.

The second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located.

The second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located.

The second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located.

The second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located.

The first time domain symbol is a candidate time domain symbol used to receive the SS block, the second time domain symbol is a candidate time domain symbol used to receive the CORESET, and the second other time domain symbol is an time domain symbol, other than a candidate transmission position of the SS block, an Uplink (UL) control and a guard period, of the slot where the CORESET is located.

In addition to indication information for indicating the CORESET configuration codebook, the second indication field includes at least one of: third indication information, for indicating a transmission mode of the SS block; fourth indication information, for indicating that the CORESET occupies four time domain symbols of a time domain resource; or fifth indication information, for indicating that at least a part of the CORESET occupies an idle resource block of the SS block.

The reception module 2310 includes: a reception unit, configured to receive a synchronized signal block (SS block) transmitted by the network equipment; a first determination unit, configured to determine a system master information block (MIB) according to the SS block; and a second determination unit, configured to determine the indication information according to the system MIB.

The terminal 2300 further includes: a blind detection module, configured to perform a blind detection of the CORESET according to the indication information when the time-frequency domain position information of the CORESET of the data information is not determined according to the indication information. The time-frequency domain position information of the CORESET is determined according to numerology information for the CORESET.

It is noted, the terminal provided by the embodiment of the present disclosure receives a first indication field for indicating downlink numerology information and a second indication field for indicating a CORESET configuration codebook transmitted by the network equipment. By indicating the time-frequency positions of the CORESET of data information jointly with the first indication field and the second indication field, the bit overhead of the system MIB may be reduced, thereby improving resource utilization.

It is understood, the modular division of the network equipment and the terminal is merely a logical function division, and in actual implementation the modules may be integrated entirely or partly on one physical entity or physically separated. These modules may be entirely implemented in form of software that may be called and executed by a processing element, or entirely implemented in form of hardware, or partly implemented in form of software that may be called and executed by a processing element and partly implemented in form of hardware. For example, a determination module may be a standalone processing element, or integrated in a chip of the device, or may be stored in a storage of the device in form of program code which is configured to be called by a processing element of the device to implement the function of the determination module. Other modules may be implemented in a similar way. In addition, the modules may be entirely or partly integrated together, or implemented separately. The described processing element may be an integrated circuit with signal processing capability. During an implementation process, steps of the methods or the modules may be realized in form of hardware by integrated logical circuits in the processing element, or in form of software by instructions.

For example, these modules may be one or more integrated circuits (ICs) configured to implement the foregoing methods, e.g., one or more application specific integrated circuits (ASICs), one or more digital signal processors (DSPs), or one or more field programmable gate arrays (FPGAs), etc. For another example, when a module is implemented in form of program code configured to be called by a processing element, the processing element may be a general purpose processor, e.g., a central processing unit (CPU) or other processor configured to call program code. For another example, these modules may be integrated together in form of a system-on-a-chip (SOC).

In order to better achieve the above objective, an embodiment of the present disclosure further provides a terminal, which includes a processor, a memory and a computer program stored in the memory and executable by the processor. The processor is configured to execute the computer program, to implement steps of the foregoing method of configuring a CORESET. An embodiment of the present disclosure further provides a computer readable storage medium storing therein a computer program, where the computer program is configured to be executed by a processor, to implement steps of the foregoing method of configuring a CORESET.

Figure 24:
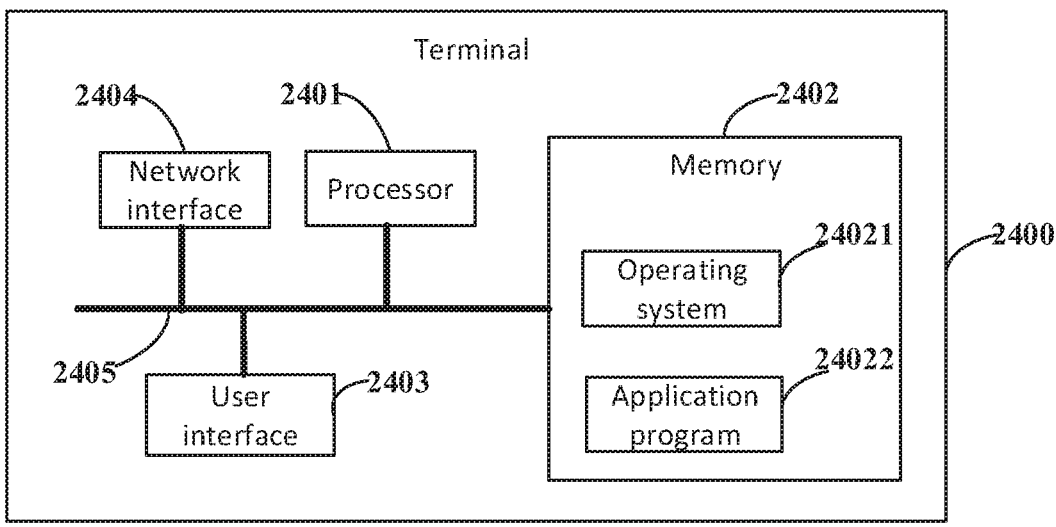
FIG. 24 is a block diagram of a terminal according to an embodiment of the present disclosure.

Specifically, FIG. 24 is a block diagram of a terminal 2400 according to another embodiment of the present disclosure. The terminal shown in FIG. 24 includes at least one processor 2401, a memory 2402, a user interface 2403, and a network interface 2404. The various components in the terminal 2400 are coupled together by a bus system 2405. It will be appreciated that the bus system 2405 is configured to enable connection communication between these components. The bus system 2405 includes a power bus, a control bus, and a status signal bus in addition to a data bus. However, for clarity of description, various buses are all labeled as the bus system 2405 in FIG. 24.

The user interface 2403 may include a display or a point-and-click device (e.g., a touchpad) or a touch screen, etc.

It is to be understood that the memory 2402 in the embodiment of the present disclosure may be a volatile or non-volatile memory, or may include both. The non-volatile memory may be a read-only memory (ROM), a programmable ROM (PROM), an erasable PROM (EPROM), an electrically EPROM (EEPROM) or a flash memory. The volatile memory may be a random access memory (RAM), which is used as an external cache. By way of example and without any limitation, many forms of RAMs may be used, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 2402 of the systems and methods described herein is intended to include, but is not limited to, these and any other suitable types of memories.

In some implementations, the memory 2402 stores the following elements: executable modules or data structures, or a subset or extended set thereof, such as an operating system 24021 and an application program 24022.

The operating system 24021 includes various system programs, such as a framework layer program, a core library layer program and a driver layer program, to implement various basic services and process hardware-based tasks. The application program 24022 includes various application programs, such as a media player and a browser, to implement various application services. A program implementing the methods of the present disclosure may be included in the application program 24022.

In the embodiment of the present disclosure, the terminal 2400 further includes: a computer program stored in the memory 2402 and executable by the processor 2401, and specifically, the computer program may be a computer program in the application program 24022. The computer program is configured to be executed by the processor 2401, to implement the following step: receiving indication information transmitted by network equipment; where the indication information includes: a first indication field for indicating downlink numerology information and a second indication field for indicating a CORESET configuration codebook; and determining time-frequency domain position information of the CORESET of data information according to the first indication field and the second indication field.

The method disclosed in the embodiments of the present disclosure may be applied to the processor 2401 or implemented by the processor 2401. The processor 2401 may be an integrated circuit chip having a signal processing capability. During an implementation process, steps of the methods may be realized in form of hardware by integrated logical circuits in the processor 2401, or in form of software by instructions. The processor 2401 may be a general purpose processor, digital signal processor (DSP), application specific integrated circuit (ASIC), field programmable gate array (FPGA) or other programmable logic device, discrete gate or transistor logic device, discrete hardware component, that is capable of implementing or executing the various methods, steps and logic block diagrams disclosed in the embodiments of the present disclosure. The general purpose processor may be a microprocessor, or any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established storage medium in the art, such as a RAM, flash memory, ROM, PROM or EEPROM, register. The storage medium resides in the memory 2402. The processor 2401 reads information from the memory 2402 and performs the steps of the methods with its hardware.

It is understood, the embodiments described in the present disclosure may be implemented by hardware, software, firmware, middleware, microcode or a combination thereof. For hardware implementation, processing units may be implemented in one or more application specific integrated circuits (ASICs), digital signal processor (DSP), DSP device (DSPD), programmable logic device (PLD), field programmable gate array (FPGA), general purpose processor, controller, microcontroller, microprocessor, other electronic unit configured to perform the function described in this application or a combination thereof.

For software implementation, the technical solution described herein may be implemented by a module (e.g., process, function, etc.) configured to perform the function described herein. Software code may be stored in a memory and executed by the processor. The memory may be implemented internal or external to the processor.

The first indication field includes at least one of: first indication information for indicating whether numerology information for the CORESET is the same as numerology information for the SS block; or second indication information for indicating the numerology information for the CORESET.

When the numerology information for the SS block is first numerology information, if the second indication information is a first value, the second indication information indicates that the numerology information for the CORESET is second numerology information corresponding to the first numerology information.

The CORESET configuration codebook includes at least one of following information: a time domain position of the CORESET, a time domain duration of the CORESET, a frequency domain position of the CORESET, a frequency domain width of the CORESET, an aggregation level (AL) of the CORESET, a distribution mode of the CORESET or a multiplexing pattern of the CORESET and the SS block.

The CORESET configuration codebook includes: a first configuration codebook in which numerology information for the CORESET is the same as numerology information for a synchronized signal block (SS block), or a second configuration codebook in which the numerology information for the CORESET is different from the numerology information for the SS block.

The second indication field indicates, when the second indication field denotes a first value of the first configuration codebook, that the CORESET is frequency division multiplexed with the SS block and the CORESET occupies two first time domain symbols of a transmission resource of the SS block.

The second indication field indicates, when the second indication field denotes a second value of the first configuration codebook, that the CORESET is frequency division multiplexed with the SS block and the CORESET occupies three first time domain symbols of the transmission resource of the SS block.

The second indication field indicates, when the second indication field denotes a third value of the first configuration codebook, that the CORESET is frequency division multiplexed with the SS block and the CORESET occupies one first time domain symbol of the transmission resource of the SS block.

The second indication field indicates, when the second indication field denotes a fourth value of the first configuration codebook, that the CORESET is time division multiplexed with the SS block, and the CORESET occupies two first other time domain symbols, overlapping with a frequency domain resource of the SS block, of a slot where the SS block is located.

The second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located.

The second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located.

The second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located.

The first time domain symbol is a candidate time domain symbol used to receive the SS block, and the first other time domain symbol is an time domain symbol, other than a candidate transmission position of the SS block, an Uplink (UL) control and a guard period, of the slot where the SS block is located.

The second indication field indicates, when the second indication field denotes a first value of the second configuration codebook, that the CORESET is frequency division multiplexed with the SS block and the CORESET occupies one second time domain symbol within a range of first time domain symbols where the SS block is located.

The second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located.

The second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located.

The second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located.

The second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located.

The second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located.

The first time domain symbol is a candidate time domain symbol used to receive the SS block, the second time domain symbol is a candidate time domain symbol used to receive the CORESET, and the second other time domain symbol is an time domain symbol, other than a candidate transmission position of the SS block, an Uplink (UL) control and a guard period, of the slot where the CORESET is located.

In addition to indication information for indicating the CORESET configuration codebook, the second indication field includes at least one of: third indication information, for indicating a transmission mode of the SS block; fourth indication information, for indicating that the CORESET occupies four time domain symbols of a time domain resource; or fifth indication information, for indicating that at least a part of the CORESET occupies an idle resource block of the SS block.

Specifically, the processor 2401 is configured to execute the computer program to implement following steps: receiving a synchronized signal block (SS block) transmitted by the network equipment; determining a system master information block (MIB) according to the SS block; and determining the indication information according to the system MIB.

Specifically, the processor 2401 is configured to execute the computer program to implement following step: performing a blind detection of the CORESET according to the indication information when the time-frequency domain position information of the CORESET of the data information is not determined according to the indication information. The time-frequency domain position information of the CORESET is determined according to numerology information for the CORESET.

The terminal may be a wireless terminal or a wired terminal. The wireless terminal may refer to a device that provides voice and/or other service data connectivity to the user, a handheld device having a wireless connecting function, or other processing device connected to a wireless modem. The wireless terminal may communicate with one or more core networks via a radio access network (RAN), and the wireless terminal may be a mobile terminal, such as a mobile phone (or referred to as "cellular" phone) and a computer having a mobile terminal, for example, a portable, pocket-sized, handheld, computer built-in or in-vehicle mobile device that exchanges voice and/or data with the radio access network. For example, it may be a personal communication service (PCS) telephone, cordless telephone, session initiation protocol (SIP) telephone, wireless local loop (WLL) station, personal digital assistant (PDA) or the like. The wireless terminal may also be referred to as a system, a subscriber unit, a subscriber station, a mobile station, a mobile, a remote station, a remote terminal, an access terminal, a user terminal, a user agent, a user device or user equipment, and is not limited herein.

The terminal provided by the embodiment of the present disclosure receives a first indication field for indicating downlink numerology information and a second indication field for indicating a CORESET configuration codebook transmitted by the network equipment. By indicating the time-frequency positions of the CORESET of data information jointly with the first indication field and the second indication field, the bit overhead of the system MIB may be reduced, thereby improving resource utilization.

A person skilled in the art may be aware that, the exemplary units and algorithm steps described in connection with the embodiments disclosed herein may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If a function is implemented in form of software functional unit and sold or used as an independent product, it may be stored in a computer-readable storage medium. Based on such an understanding, essential part or the part contributing to the prior art of the technical solutions of the present disclosure, or a part of the technical solutions may be implemented in form of a software product. The software product is stored in a storage medium, and includes several instructions for instructing a computer device (which may be a personal computer, a server, or network equipment) to perform all or a part of the steps of the methods described in the embodiments of the disclosure. The foregoing storage medium includes any medium that may store program code, such as a universal serial bus (USB) flash drive, a mobile hard disk, an ROM, an RAM, a magnetic disk, or an optical disc.

Further, it is noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other. It is appreciated by a person of ordinary skill in the art that, all or any steps or components of the method and apparatus of the present disclosure may be implemented in form of hardware, firmware, software or a combination thereof in any computing device (including a processor, storage medium or the like) or a network of computing devices, which may be realized by a person of ordinary skill in the art, having read the description of the present disclosure, using basic programming skills.

Therefore, the objective of the present disclosure may further be achieved by running a program or a group of programs on any computing device. The computing device may be a well-known general-purpose device. Thus, the objective of the present disclosure may further be achieved by providing a program product including program codes configured to implement the method or apparatus. In other words, such a program product constitutes the present disclosure, and a storage medium storing such a program product also constitutes the present disclosure. Obviously, the storage medium may be any well-known storage medium or any storage medium to be developed in the future. It is also noted, apparently, the components or steps in the apparatus and method of the present disclosure may be subdivided and/or recombined. These subdivisions and/or recombinations should be considered as equivalent solutions to the present disclosure. Moreover, the steps of the foregoing series of process may be performed naturally in a chronological order in which the steps are described, however, the steps are not necessarily performed in the chronological order. Instead, some steps may be performed concurrently or independently of each other.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A method of configuring a control resource set (CORESET), applied to a network equipment side, comprising:
configuring, for a terminal, indication information for indicating time-frequency domain position information of the CORESET; wherein the indication information comprises; a first indication field for indicating downlink numerology information and a second indication field for indicating a CORESET configuration; and
transmitting the indication information to the terminal via a system master information block (MIB);
wherein the first indication field comprises at least one of:
first indication information for indicating whether numerology information for the CORESET is the same as numerology information for a synchronized signal block (SS block); or
second indication information for indicating the numerology information for the CORESET;
wherein the numerology information comprises a subcarrier spacing;
when a system bandwidth lies above 6 GHz, if the second indication information is a first value, the second indication information indicates that the numerology information for the CORESET is first numerology information;
when a system bandwidth lies below 6 GHz, if the second indication information is a first value, the second indication information indicates that the numerology information for the CORESET is second numerology information;
when a subcarrier spacing of the SS block is 120 kHz, if the second indication information is one of two values, the second indication information indicates that a subcarrier spacing for the CORESET is 60 kHz Which corresponds to the 120 kHz; if the second indication information is another of the two values, the second indication information indicates that the subcarrier spacing for the CORESET is 120 kHz which corresponds to the 120 kHz;
when the subcarrier spacing for the SS block is 240 kHz, if the second indication information is one of the two values, the second indication information indicates that the subcarrier spacing for the CORESET is 60 kHz which corresponds to the 240 kHz; if the second indication information is another of the two values, the second indication information indicates that the subcarrier spacing for the CORESET is 120 kHz which corresponds to the 240 kHz.

2. The method according to claim 1, wherein the CORESET configuration comprises at least one of following information:
a time domain position of the CORESET, a time domain duration of the CORESET, a frequency domain position of the CORESET, a frequency domain width of the CORESET, an aggregation level (AL) of the CORESET, a distribution mode of the CORESET or a multiplexing pattern with SS block.

3. The method according to claim 1, wherein the CORESET configuration comprises: a first configuration codebook in which numerology information for the CORESET is the same as numerology information for a synchronized signal block (SS block), or a second configuration codebook in which the numerology information for the CORESET is different from the numerology information for the SS block.

4. The method according to claim 3, wherein,
the second indication field indicates, when the second indication field denotes a first value of the first configuration codebook, that the CORESET is frequency division multiplexed with the SS block, and the CORESET occupies two first time domain symbols of a transmission resource of the SS block; and/or
the second indication field indicates, when the second indication field denotes a second value of the first configuration codebook, that the CORESET is frequency division multiplexed with the SS block and the CORESET occupies three first time domain symbols of the transmission resource of the SS block; and/or
the second indication field indicates, when the second indication field denotes a third value of the first configuration codebook, that the CORESET is frequency division multiplexed with the SS block and the CORESET occupies one first time domain symbol of the transmission resource of the SS block; and/or
the second indication field indicates, when the second indication field denotes a fourth value of the first configuration codebook, that the CORESET is time division multiplexed with the SS block, and the CORESET overlaps with a frequency domain resource of the SS block and occupies two first other time domain symbols of a slot where the SS block is located; and/or
the second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located; and/or
the second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located; and/or
the second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located;

wherein, the first time domain symbol is a candidate time domain symbol used to transmit the SS block, and the first other time domain symbol is an time domain symbol, other than a candidate transmission position of the SS block, an Uplink (UL) control and a guard period, of the slot where the SS block is located.

5. The method according to claim 3, wherein, the second indication field indicates, when the second indication field denotes a first value of the second configuration codebook, that the CORESET is frequency division multiplexed with the SS block and the CORESET occupies one second time domain symbol within a range of first time domain symbols where the SS block is located; and/or the second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located; and/or the second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located; and/or the second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located; and/or the second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located; and/or the second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located; and/or wherein, the first time domain symbol is a candidate time domain symbol used to transmit the SS block, the second time domain symbol is a candidate time domain symbol used to transmit the CORESET, and the second other time domain symbol is an time domain symbol, other than a candidate transmission position of the SS block, an Uplink (UL) control and a guard period, of the slot where the CORESET is located.

6. The method according to claim 1, wherein, in addition to indication information for indicating the CORESET configuration, the second indication field comprises at least one of:

third indication information, for indicating a transmission mode of the SS block;

fourth indication information, for indicating that the CORESET occupies four time domain symbols of a time domain resource; or fifth indication information, for indicating that at least a part of the CORESET occupies an idle resource block of the SS block.

7. A method of configuring a control resource set (CORESET), applied to a terminal side, comprising:

receiving indication information transmitted by network equipment; wherein the indication information comprises: a first indication field for indicating downlink numerology information and a second indication field for indicating a CORESET configuration; and determining time-frequency domain position information of the CORESET according to the first indication field and the second indication field;

wherein the receiving the indication information transmitted by the network equipment comprises:

receiving a synchronized signal block (SS block) transmitted by the network equipment;

determining a system master information block (MIB) according to the SS block; and determining the indication information according to the system MIB;

wherein the first indication field comprises at least one of:

first indication information for indicating Whether numerology information for the CORESET is the same as numerology information for the SS block; or second indication information for indicating the numerology information for the CORESET;

wherein the numerology information comprises a subcarrier spacing;

when a system bandwidth lies above 6 GHz, if the second indication information is a first value, the second indication information indicates that the numerology information for the CORESET is first numerology information;

when a system bandwidth lies below 6 GHz, if the second indication information is a first value, the second indication information indicates that the numerology information for the CORESET is second numerology information;

when a subcarrier spacing of the SS block is 120 kHz, if the second indication information is one of two values, the second indication information indicates that a subcarrier spacing for the CORESET is 60 kHz which corresponds to the 120 kHz; if the second indication information is another of the two values, the second indication information indicates that the subcarrier spacing for the COREsET is 120 kHz which corresponds to the 120 kHz;

when the subcarrier spacing for the SS block is 240 kHz, if the second indication information is one of the two values, the second indication information indicates that the subcarrier spacing for the CORESET is 60 kHz which corresponds to the 240 kHz; if the second indication information is another of the two values, the second indication information indicates that the subcarrier spacing for the CORESET is 120 kHz which corresponds to the 240 kHz.

8. The method according to claim 7, wherein the CORESET configuration comprises at least one of following information:
a time domain position of the CORESET, a time domain duration of the CORESET, a frequency domain position of the CORESET, a frequency domain width of the CORESET, an aggregation level (AL) of the CORESET, a distribution mode of the CORESET or a multiplexing pattern with SS block.

9. The method according to claim 7, wherein the CORESET configuration comprises: a first configuration codebook in which numerology information for the CORESET is the same as numerology information for a synchronized signal block (SS block), or a second configuration codebook in which the numerology information for the CORESET is different from the numerology information for the SS block.

10. The method according to claim 9, wherein,
the second indication field indicates, when the second indication field denotes a first value of the first configuration codebook, that the CORESET is frequency division multiplexed with the SS block and the CORESET occupies two first time domain symbols of a transmission resource of the SS block; and/or
the second indication field indicates, when the second indication field denotes a second value of the first configuration codebook, that the CORESET is frequency division multiplexed with the SS block and the CORESET occupies three first time domain symbols of the transmission resource of the SS block; and/or
the second indication field indicates, when the second indication field denotes a third value of the first configuration codebook, that the CORESET is frequency division multiplexed with the SS block and the CORESET occupies one first time domain symbol of the transmission resource of the SS block; and/or
the second indication field indicates, when the second indication field denotes a fourth value of the first configuration codebook, that the CORESET is time division multiplexed with the SS block, and the CORESET occupies two first other time domain symbols, overlapping with a frequency domain resource of the SS block, of a slot where the SS block is located; and/or
the second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located; and/or
the second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located; and/or
the second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located;
wherein, the first time domain symbol is a candidate time domain symbol used to receive the SS block, and the first other time domain symbol is an time domain symbol, other than a candidate transmission position of the SS block, an Uplink (UL) control and a guard period, of the slot where the SS block is located.

11. The method according to claim 9, wherein,
the second indication field indicates, when the second indication field denotes a first value of the second configuration codebook, that the CORESET is frequency division multiplexed with the SS block and the CORESET occupies one second time domain symbol within a range of first time domain symbols where the SS block is located; and/or
the second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located; and/or
the second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located; and/or
the second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located; and/or
the second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located; and/or
the second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located;
wherein, the first time domain symbol is a candidate time domain symbol used to receive the SS block, the second time domain symbol is a candidate time domain symbol used to receive the CORESET, and the second other time domain symbol is an time domain symbol, other than a, candidate transmission position of the SS block, an Uplink (UL) control and a guard period, of the slot where the CORESET is located.

12. The method according to claim 7, wherein, in addition to indication information for indicating the CORESET configuration, the second indication field comprises at least one of:
third indication information, for indicating a transmission mode of the SS block;
fourth indication information, for indicating that the CORESET occupies four OFDM symbols of a time domain resource; or
fifth indication information, for indicating that at least a part of the CORESET occupies an idle resource block of the SS block.

13. A terminal, comprising a processor, a memory and a computer program stored in the memory and configured to be executed by the processor, wherein the processor is configured to execute the computer program, to implement following steps:
receiving indication information transmitted by network equipment; wherein the indication information comprises: a first indication field for indicating downlink numerology information and a second indication field for indicating a CORESET configuration; and
determining time-frequency domain position information of the CORESET according to the first indication field and the second indication field;
wherein the receiving the indication information transmitted by the network equipment comprises:
receiving a synchronized signal block (SS block) transmitted by the network equipment;
determining a system master information block (MIB) according to the SS block; and
determining the indication information according to the system MIB;
wherein the first indication field comprises at least one of:
first indication information for indicating whether numerology information for the CORESET is the same as numerology information for the SS block; or
second indication information for indicating the numerology information for the CORESET;
wherein the numerology information comprises a subcarrier spacing;
when a system bandwidth lies above 6 GHz, if the second indication information is a first value, the second indication information indicates that the numerology information for the CORESET is first numerology information;
when a system bandwidth lies below 6 GHz, if the second indication information is a first value, the second indication information indicates that the numerology information for the CORESET is second numerology information;
when a subcarrier spacing of the SS block is 120 kHz, if the second indication information is one of two values, the second indication information indicates that a subcarrier spacing for the CORESET is 60 kHz which corresponds to the 120 kHz; if the second indication information is another of the two values, the second indication information indicates that the subcarrier spacing for the COREsET is 120 kHz which corresponds to the 120 kHz;
when the subcarrier spacing for the SS block is 240 kHz, if the second indication information is one of the two values, the second indication information indicates that the subcarrier spacing for the CORESET is 60 kHz which corresponds to the 240 kHz; if the second indication information is another of the two values, the second indication information indicates that the sub-carrier spacing for the CORESET is 120 kHz which corresponds to the 240 kHz.

14. The terminal according to claim 13, wherein the CORESET configuration comprises at least one of following information:
a time domain position of the CORESET, a time domain duration of the CORESET, a frequency domain position of the CORESET, a frequency domain width of the CORESET, an aggregation level (AL) of the CORESET, a distribution mode of the CORESET or a multiplexing pattern with SS block.

15. The terminal according to claim 13, wherein the CORESET configuration comprises: a first configuration codebook in which numerology information for the CORESET is the same as numerology information for a synchronized signal block (SS block), or a second configuration codebook in which the numerology information for the CORESET is different from the numerology information for the SS block.

16. The terminal according to claim 15, wherein,
the second indication field indicates, when the second indication field denotes a first value of the first configuration codebook, that the CORESET is frequency division multiplexed with the SS block and the CORESET occupies two first time domain symbols of a transmission resource of the SS block; and/or
the second indication field indicates, when the second indication field denotes a second value of the first configuration codebook, that the CORESET is frequency division multiplexed with the SS block and the CORESET occupies three first time domain symbols of the transmission resource of the SS block; and/or
the second indication field indicates, when the second indication field denotes a third value of the first configuration codebook, that the CORESET is frequency division multiplexed with the SS block and the CORESET occupies one first time domain symbol of the transmission resource of the SS block; and/or
the second indication field indicates, when the second indication field denotes a fourth value of the first configuration codebook, that the CORESET is time division multiplexed with the SS block, and the CORESET occupies two first other time domain symbols, overlapping with a frequency domain resource of the SS block, of a slot where the SS block is located; and/or
the second indication field indicates, when the second indication field denotes a fifth value of the first configuration codebook, that the CORESET is time division multiplexed with the SS block, and the CORESET overlaps partially with a frequency domain resource of the SS block and occupies two first other time domain symbols of the slot where the SS block is located; and/or
the second indication field indicates, when the second indication field denotes a sixth value of the first configuration codebook, that the CORESET is time division multiplexed with the SS block, and the CORESET has at least a part overlapping with a frequency domain resource of the SS block and occupies one first other time domain symbol of the slot where the SS block is located; and/or
the second indication field indicates, when the second indication field denotes a seventh value of the first configuration codebook, that at least two CORESETs are time division multiplexed with the SS block, and the at least two CORESETs have at least a part overlapping with a frequency domain resource of the SS block and occupy two first other time domain symbols of the slot where the SS block is located;

wherein, the first time domain symbol is a candidate time domain symbol used to receive the SS block, and the first other time domain symbol is an time domain symbol, other than a candidate transmission position of the SS block, an Uplink (UL) control and a guard period, of the slot where the SS block is located.

17. The terminal according to claim 15, wherein, the second indication field indicates, when the second indication field denotes a first value of the second configuration codebook, that the CORESET is frequency division multiplexed with the SS block and the CORESET occupies one second time domain symbol within a range of first time domain symbols where the SS block is located; and/or the second indication field indicates, when the second indication field denotes a second value of the second configuration codebook, that the CORESET is frequency division multiplexed with the SS block and the CORESET occupies high frequency resource or low frequency resource in two second time domain symbols within the range of the first time domain symbols where the SS block is located; and/or the second indication field indicates, when the second indication field denotes a third value of the second configuration codebook, that the CORESET is frequency division multiplexed with the SS block and the CORESET occupies high frequency resource and low frequency resource in two second time domain symbols within the range of the first time domain symbols where the SS block is located; and/or the second indication field indicates, when the second indication field denotes a fourth value of the second configuration codebook, that the CORESET is time division multiplexed with the SS block, and the CORESET overlaps with at least a part of a frequency domain resource of the SS block and occupies one second other time domain symbol of a slot where the CORESET is located; and/or the second indication field indicates, when the second indication field denotes a fifth value of the second configuration codebook, that the CORESET is time division multiplexed with the SS block, and the CORESET has at least one first part overlapping with at least a part of a frequency domain resource of the SS block and has at least one second part not overlapping with at least a part of the frequency domain resource of the SS block, and occupies one second other time domain symbol of the slot where the CORESET is located; and/or the second indication field indicates, when the second indication field denotes a sixth value of the second configuration codebook, that at least two CORESETs are time division multiplexed with the SS block, and the at least two CORESETs have at least a part overlapping with a frequency domain resource of the SS block and occupy at least one second other time domain symbol of the slot where the CORESETs are located;

wherein, the first time domain symbol is a candidate time domain symbol used to receive the SS block, the second time domain symbol is a candidate time domain symbol used to receive the CORESET, and the second other time domain symbol is an time domain symbol, other than a candidate transmission position of the SS block, an Uplink (UL) control and a guard period, of the slot where the CORESET is located.

18. The terminal according to claim 13, wherein, in addition to indication information for indicating the CORESET configuration, the second indication field comprises at least one of:

third indication information, for indicating a transmission mode of the SS block;

fourth indication information, for indicating that the CORESET occupies four OFDM symbols of a time domain resource; or fifth indication information, for indicating that at least a part of the CORESET occupies an idle resource block of the SS block.

* * * * *